United States Patent
Nakayama et al.

(10) Patent No.: US 10,403,896 B2
(45) Date of Patent: Sep. 3, 2019

(54) BINDER COMPOSITION FOR STORAGE DEVICE ELECTRODE, SLURRY FOR STORAGE DEVICE ELECTRODE, STORAGE DEVICE ELECTRODE, AND STORAGE DEVICE

(71) Applicant: JSR CORPORATION, Minato-ku (JP)

(72) Inventors: Takuya Nakayama, Minato-ku (JP); Souichi Saijou, Minato-ku (JP); Masashi Iida, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 15/509,305

(22) PCT Filed: Aug. 13, 2015

(86) PCT No.: PCT/JP2015/072886
§ 371 (c)(1),
(2) Date: Mar. 7, 2017

(87) PCT Pub. No.: WO2016/039067
PCT Pub. Date: Mar. 17, 2016

(65) Prior Publication Data
US 2017/0279123 A1    Sep. 28, 2017

(30) Foreign Application Priority Data

Sep. 8, 2014    (JP) ................................ 2014-182250

(51) Int. Cl.
| | | |
|---|---|---|
| *H01M 4/62* | (2006.01) | |
| *H01M 4/13* | (2010.01) | |
| *H01M 4/139* | (2010.01) | |
| *H01M 4/38* | (2006.01) | |
| *H01M 4/58* | (2010.01) | |
| *H01G 11/30* | (2013.01) | |
| *H01M 4/64* | (2006.01) | |
| *H01M 10/056* | (2010.01) | |
| *H01M 4/04* | (2006.01) | |
| *H01M 4/1395* | (2010.01) | |
| *H01M 4/1397* | (2010.01) | |

(52) U.S. Cl.
CPC ............ *H01M 4/621* (2013.01); *H01G 11/30* (2013.01); *H01M 4/0404* (2013.01); *H01M 4/13* (2013.01); *H01M 4/139* (2013.01); *H01M 4/1395* (2013.01); *H01M 4/1397* (2013.01); *H01M 4/38* (2013.01); *H01M 4/386* (2013.01); *H01M 4/58* (2013.01); *H01M 4/5825* (2013.01); *H01M 4/62* (2013.01); *H01M 4/622* (2013.01); *H01M 4/64* (2013.01); *H01M 10/056* (2013.01)

(58) Field of Classification Search
CPC .............. H01M 4/621; H01M 4/386
See application file for complete search history.

(56) References Cited

U.S. PATENT DOCUMENTS

| | | |
|---|---|---|
| 8,513,349 B2 | 8/2013 | Ootsuka et al. |
| 8,663,839 B2 | 3/2014 | Maegawa et al. |
| 8,709,652 B2 | 4/2014 | Maegawa et al. |
| 9,171,675 B2 | 10/2015 | Kojima et al. |
| 9,520,242 B2 | 12/2016 | Kitaguchi et al. |
| 9,522,995 B2 | 12/2016 | Otsuka et al. |
| 9,583,278 B2 | 2/2017 | Miyauchi et al. |
| 2003/0157407 A1 | 8/2003 | Kosuzu et al. |
| 2005/0233213 A1 | 10/2005 | Lee et al. |
| 2006/0237697 A1 | 10/2006 | Kosuzu et al. |
| 2008/0090152 A1 | 4/2008 | Kosuzu et al. |
| 2010/0323098 A1 | 12/2010 | Kosuzu et al. |
| 2012/0276447 A1 | 11/2012 | Nishinaka et al. |
| 2012/0295159 A1 | 11/2012 | Kobayashi |
| 2013/0101897 A1 | 4/2013 | Fukui et al. |
| 2014/0038041 A1 | 2/2014 | Kajiwara et al. |
| 2014/0234535 A1 | 8/2014 | Lee et al. |
| 2015/0187516 A1* | 7/2015 | Miyauchi .............. H01M 4/134 361/502 |

FOREIGN PATENT DOCUMENTS

| | | |
|---|---|---|
| CN | 102439771 A | 5/2012 |
| JP | 2004-185810 A | 7/2004 |
| JP | 2005-259697 A | 9/2005 |
| JP | 2007-294323 A | 11/2007 |
| JP | 2010-3703 A | 1/2010 |
| JP | 2010-205722 A | 9/2010 |

(Continued)

OTHER PUBLICATIONS

Ning et al. (Materials Letters, vol. 117, Feb. 15, 2014, pp. 294-297).*
U.S. Appl. No. 13/599,288, filed Aug. 30, 2012, US 2013-0052530 A1, Hironori Kitaguchi et al.
U.S. Appl. No. 13/977,255, filed Aug. 15, 2013, US 2013-0323588 A1, Ichiro Kajiwara et al.
U.S. Appl. No. 13/983,428, filed Oct. 9, 2013, US 2014-0217322 A1, Kinji Yamada et al.
U.S. Appl. No. 13/985,390, filed Oct. 18, 2013, US 2014-0038041 A1, Ichiro Kajiwara et al.
U.S. Appl. No. 14/427,233, filed Mar. 10, 2015, US 2015-0240039 A1, Kouhei Katsuda et al.

(Continued)

*Primary Examiner* — Olatunji A Godo
(74) *Attorney, Agent, or Firm* — Oblon, McClelland, Maier & Neustadt, L.L.P.

(57) ABSTRACT

An electrical storage device electrode binder composition exhibits an excellent binding capability, and makes it possible to produce an electrical storage device electrode that exhibits excellent charge-discharge durability characteristics. The electrical storage device electrode binder composition includes a polymer (A) and a liquid medium (B), wherein the polymer (A) is polymer particles, and the ratio (DA/DB) of the average particle size (DA) of the polymer particles measured by using a dynamic light scattering method to the average particle size (DB) of the polymer particles measured by TEM observation is 2 to 10.

15 Claims, No Drawings

(56) References Cited

FOREIGN PATENT DOCUMENTS

| | | | |
|---|---|---|---|
| JP | 2011-204592 A | | 10/2011 |
| JP | 2012-216322 A | | 11/2012 |
| KR | 10-2014-0044409 | | 4/2014 |
| WO | 2010/113940 A1 | | 10/2010 |
| WO | 2011/096463 A1 | | 8/2011 |
| WO | 2013/191080 A1 | | 12/2013 |
| WO | WO2013191080 | * | 12/2013 |

OTHER PUBLICATIONS

U.S. Appl. No. 14/779,840, filed Sep. 24, 2015, US 2016-0079007 A1, Yoshiharu Otsuka et al.

U.S. Appl. No. 14/893,875, filed Nov. 24, 2015, US 2016-0104893 A1, Kazuaki Itou et al.

International Search Report dated Nov. 10, 2015 in PCT/JP2015/072886 filed Aug. 13, 2015.

Notification of Reasons for Refusal dated Feb. 3, 2016 in Japanese Application No. 2015-558299 (with computer generated English translation).

Notification of Reasons for Refusal dated May 25, 2016 in Japanese Application No. 2015-558299 (with computer generated English translation).

Office Action dated Jan. 19, 2018 in Korean Patent Application No. 10-2017-7005272 with computer-generated English translation, 11 pages.

Extended European Search Report dated Jan. 26, 2018 in Patent Application No. 15840298.2, 6 pages.

Office Action dated Jun. 22, 2018 in Korean Patent Application No. 10-2017-7005272 (w/ computer-generated English translation).

Chinese Office Action dated Sep. 3, 2018, in Chinese Patent Application No. 201580039880.6 (w/ Computer-generated English translation).

Office Action dated Sep. 19, 2018 in Taiwan Patent Application No. 104128817 (w/ English translation).

Combined Office Action and Search Report dated Jan. 28, 2019 in Chinese Patent Application No. 201580039880.6 (with unedited computer generated English translation of the Global Dossier Service and English translation of categories of cited documents).

* cited by examiner

BINDER COMPOSITION FOR STORAGE DEVICE ELECTRODE, SLURRY FOR STORAGE DEVICE ELECTRODE, STORAGE DEVICE ELECTRODE, AND STORAGE DEVICE

TECHNICAL FIELD

The present invention relates to an electrical storage device electrode binder composition, an electrical storage device electrode slurry that includes the binder composition and an active material, an electrical storage device electrode that is produced by applying the slurry to a collector, and drying the applied slurry, and an electrical storage device that includes the electrode.

BACKGROUND ART

In recent years, a high-voltage electrical storage device having high energy density has been desired as a power supply for driving an electronic device. A lithium-ion battery, a lithium-ion capacitor, and the like are considered to be a promising electrical storage device having such performance.

An electrode used for such an electrical storage device is normally produced by applying a composition (electrode slurry) that includes an active material and a polymer that functions as a binder to the surface of a collector, and drying the applied composition. The polymer used as a binder is required to have a capability to bind the active material, a capability to bind (bond) the active material and the collector, scratch resistance when winding the electrode, fall-off resistance (i.e., a fine powder of the active material or the like does not fall off from the layer (film) formed by applying and drying the composition (hereinafter may be referred to as "active material layer") due to cutting or the like), and the like.

It was experimentally found that a capability to bind the active material, a capability to bind (bond) the active material and the collector, and the fall-off resistance have an almost proportional relationship. These properties may be comprehensively referred to herein as "binding capability".

In recent years, use of a material having a high lithium occlusion capacity has been studied in order to increase the output and the energy density of the electrical storage device. For example, a method that utilizes a silicon material having a theoretical lithium occlusion capacity of up to about 4,200 mAh/g as the active material (see Patent Literature 1) is considered to be promising.

However, an active material that utilizes a material having high lithium occlusion capacity significantly changes in volume due to occlusion and release of lithium. Therefore, when a known electrode binder is applied to a material having a high lithium occlusion capacity, the active material may be removed due to deterioration in binding capability, and a significant decrease in capacity occurs due to charge and discharge, for example.

A technique that controls the amount of acid present on the surface of binder particles (see Patent Literature 1 and 2), a technique that utilizes an epoxy or hydroxyl group-containing binder (see Patent Literature 4 and 5), and the like have been proposed as a technique for improving the binding capability of an electrode binder. A technique that restrains the active material using the rigid molecular structure of a polyimide to suppress a change in volume of the active material has also been proposed (see Patent Literature 6).

A lithium-containing phosphoric acid compound having an olivine structure (olivine-type lithium-containing phosphoric acid compound) has attracted attention as a positive electrode active material that is highly safety. Since the olivine-type lithium-containing phosphoric acid compound has a structure in which phosphorus and oxygen are covalently bonded, the olivine-type lithium-containing phosphoric acid compound exhibits high thermal stability, and does not release oxygen even at a high temperature.

However, since the olivine-type lithium-containing phosphoric acid compound is characterized in the Li ion occlusion-release voltage is about 3.4 V, the output voltage is low. In order to compensate this drawback, attempts have been made to improve the properties of the electrode binder, the electrolyte solution, and the like (see Patent Literature 7 to 9).

CITATION LIST

Patent Literature

PTL 1: JP-A-2004-185810
PTL 2: WO2011/096463
PTL 3: WO2013/191080
PTL 4: JP-A-2010-205722
PTL 5: JP-A-2010-3703
PTL 6: JP-A-2011-204592
PTL 7: JP-A-2007-294323
PTL 8: WO2010/113940
PTL 9: JP-A-2012-216322

SUMMARY OF INVENTION

Technical Problem

However, the binding capability of the electrode binders disclosed in Patent Literature 1 to 6 is insufficient for implementing the practical use of a novel active material such as a silicon material that has large lithium occlusion capacity and changes in volume to a large extent due to occlusion and release of lithium. When the electrode binders disclosed in Patent Literature 1 to 6 are used, since the active material is removed (i.e., the electrode deteriorates) due to repeated charge and discharge, for example, durability sufficient for practical use cannot be obtained.

According to the techniques disclosed in Patent Literature 7 to 9 that improve the properties of the electrode binder, the electrolyte solution, and the like, it is difficult to sufficiently improve the charge-discharge durability characteristics of the electrical storage device that includes a positive electrode produced using the olivine-type lithium-containing phosphoric acid compound as the positive electrode active material.

Several aspects of the invention provide an electrical storage device electrode binder composition that exhibits an excellent binding capability, and makes it possible to produce an electrical storage device electrode that exhibits excellent charge-discharge durability characteristics.

Solution to Problem

The invention was conceived in order to solve at least some of the above problems, and may be implemented as described below (see the following aspects and application examples).

APPLICATION EXAMPLE 1

According to one aspect of the invention, an electrical storage device electrode binder composition includes:

a polymer (A) and a liquid medium (B),
wherein the polymer (A) is polymer particles, and
the ratio (DA/DB) of the average particle size (DA) of the polymer particles measured by using a dynamic light scattering method to the average particle size (DB) of the polymer particles measured by TEM observation is 2 to 10.

APPLICATION EXAMPLE 2

In the electrical storage device electrode binder composition according to Application Example 1, the average particle size (DA) of the polymer particles measured by using a dynamic light scattering method may be 250 to 1,000 nm.

APPLICATION EXAMPLE 3

In the electrical storage device electrode binder composition according to Application Example 1 or 2, the polymer (A) may include a repeating unit (A1) derived from an unsaturated carboxylic acid in a ratio of 10 to 70 parts by mass, provided that the total amount of repeating units included in the polymer (A) is 100 parts by mass.

APPLICATION EXAMPLE 4

In the electrical storage device electrode binder composition according to any one of Application Examples 1 to 3, the polymer (A) may have an electrolyte solution swelling ratio of 130% or less.

APPLICATION EXAMPLE 5

The electrical storage device electrode binder composition according to any one of Application Examples 1 to 4 may have a pH of 3 to 6.

APPLICATION EXAMPLE 6

According to another aspect of the invention, an electrical storage device electrode slurry includes the electrical storage device electrode binder composition according to any one of Application Examples 1 to 5, and an active material.

APPLICATION EXAMPLE 7

The electrical storage device electrode slurry according to Application Example 6 may include a silicon material as the active material.

APPLICATION EXAMPLE 8

According to another aspect of the invention, an electrical storage device electrode includes a collector, and an active material layer that is formed by applying the electrical storage device electrode slurry according to Application Example 6 or 7 to the surface of the collector, and drying the applied electrical storage device electrode slurry.

APPLICATION EXAMPLE 9

In the electrical storage device electrode according to Application Example 8, the active material layer may include silicon in a ratio of 2 to 30 parts by mass based on 100 parts by mass of the active material layer.

APPLICATION EXAMPLE 10

The electrical storage device electrode slurry according to Application Example 6 may include an olivine-type lithium-containing phosphoric acid compound as the active material.

APPLICATION EXAMPLE 11

According to another aspect of the invention, an electrical storage device electrode includes a collector, and an active material layer that is formed by applying the electrical storage device electrode slurry according to Application Example 10 to the surface of the collector, and drying the applied electrical storage device electrode slurry.

APPLICATION EXAMPLE 12

According to another aspect of the invention, an electrical storage device includes the electrical storage device electrode according to Application Example 8 or 9.

APPLICATION EXAMPLE 13

According to a further aspect of the invention, an electrical storage device includes the electrical storage device electrode according to Application Example 11.

Advantageous Effects of Invention

The electrical storage device electrode binder composition according to one aspect of the invention exhibits an excellent binding capability, and makes it possible to produce an electrical storage device electrode that exhibits excellent charge-discharge durability characteristics. In particular, the electrical storage device electrode binder composition according to one aspect of the invention achieves the above advantageous effects when the electrical storage device electrode includes an active material having high lithium occlusion capacity (e.g., carbon material (e.g., graphite) or silicon material). The electrical storage device electrode binder composition also achieves the above advantageous effects when the olivine-type lithium-containing phosphoric acid compound is used as the active material.

DESCRIPTION OF EMBODIMENTS

The exemplary embodiments of the invention are described in detail below. Note that the invention is not limited to the following exemplary embodiments. It is intended that the invention includes various modifications that can be implemented without departing from the scope of the invention. The term "(meth)acrylic acid" used herein includes both "acrylic acid" and "methacrylic acid". The term "(meth)acrylate" used herein includes both "acrylate" and "methacrylate".

1. Electrical Storage Device Electrode Binder Composition

An electrical storage device electrode binder composition (hereinafter may be referred to as "binder composition") according to one embodiment of the invention is used to produce an electrode used for an electrical storage device, and includes a polymer (A) and a liquid medium (B). Each component included in the binder composition according to one embodiment of the invention is described in detail below.

1.1. Polymer (A)

1.1.1. Average Particle Size of Polymer Particles

The polymer (A) included in the binder composition according to one embodiment of the invention is polymer particles that are dispersed in the liquid medium (B) in the form of a latex. When the polymer (A) is polymer particles, an electrical storage device electrode slurry (hereinafter may be referred to as "slurry") produced by mixing the binder composition with an active material exhibits excellent stability, and also exhibits excellent applicability to a collector.

The ratio (DA/DB) of the average particle size (DA) of the polymer particles included in the binder composition according to one embodiment of the invention measured by using a dynamic light scattering method, to the average particle size (DB) of the polymer particles included in the binder composition according to one embodiment of the invention measured by TEM observation, is 2 to 10, preferably 2.5 to 8, and more preferably 2.5 to 6.5. When the ratio (DA/DB) of the average particle size (DA) to the average particle size (DB) of the polymer particles is within the above range, it is possible to advantageously bind the active material that changes in volume to a large extent due to charge and discharge, and advantageously maintain the adhesion between the active material layer and the collector. This makes it possible to obtain an electrical storage device in which removal (separation) of the active material is reduced even when the active material repeatedly changes in volume due to repeated charge and discharge, and which can maintain excellent charge-discharge characteristics.

On the other hand, when a slurry is produced using polymer particles having a ratio (DA/DB) that falls outside the above range, it may be difficult to bind the active material, and the active material is gradually removed (gradually separates) from the active material layer. As a result, the capacity may decrease rapidly due to repeated charge and discharge, and the charge-discharge characteristics may deteriorate.

The mechanism by which the binding capability with respect to the active material, and the adhesion between the active material layer and the collector are improved, and removal (separation) of the active material is reduced when the ratio (DA/DB) of the average particle size (DA) to the average particle size (DB) of the polymer particles included in the binder composition according to one embodiment of the invention is within the above range, is not clear. It is conjectured that the above advantageous effect is obtained since the binder widely covers the surface of the particles of the active material described later (particularly the carbon material and the silicon material used as the negative electrode active material, or the olivine-type lithium-containing phosphoric acid compound used as the cathode active material).

The particle size measurement using a dynamic light scattering method is used to evaluate the polymer particles dispersed in the liquid medium (B) (i.e., binder composition). Specifically, it is considered that the polymer particles that are subjected to the particle size measurement using a dynamic light scattering method have absorbed the liquid medium (B), and swollen. On the other hand, the particle size measurement by TEM observation observes the dried polymer particles by TEM to measure the particle size in a dry state. Therefore, it is considered that the ratio (DA/DB) of the average particle size (DA) to the average particle size (DB) of the polymer particles can be used as an index of the swelling properties of the polymer particles.

It is considered that, when an electrode slurry is produced using polymer particles that have such swelling properties that the ratio (DA/DB) falls within a range from 2 to 10, the binder can widely cover the surface of the active material in a mesh-like manner. When an active material layer is formed by drying the electrode slurry (e.g., removing the liquid medium (B)) in such a state, it is possible to maintain a state in which the surface of the active material is widely covered with the polymer (A) in a mesh-like manner. It is considered that the capability to bind the active material is thus improved, and it is possible to produce an electrical storage device that exhibits excellent charge-discharge durability characteristics.

Note that the swelling properties of the polymer particles may be affected by the monomer composition of the polymer (A), but are not determined by only the monomer composition. Specifically, it is known that the swelling properties of polymer particles change depending on the polymerization conditions and the like even when an identical monomer composition is used. The examples disclosed herein illustrate mere examples of such a phenomenon.

For example, the amount of carboxylic acid derived from an unsaturated carboxylic acid that is exposed on the surface of the resulting polymer particles differs between a case where the entirety of the unsaturated carboxylic acid is initially added to the polymerization reaction mixture, and an additional monomer is sequentially added to the polymerization reaction mixture, and a case where the unsaturated carboxylic acid is added to the polymerization solution after adding a monomer other than the unsaturated carboxylic acid to the polymerization reaction mixture, even when an identical monomer composition is used. It is considered that the swelling properties of the polymer particles vary to a large extent even when only the order in which the monomers are added is changed.

The average particle size (DA) of the polymer particles measured by using a dynamic light scattering method is preferably 250 to 1,000 nm, and more preferably 300 to 800 nm. When the average particle size (DA) of the polymer particles measured by using a dynamic light scattering method is within the above range, the polymer particles are effectively adsorbed on the surface of the active material, and easily move to follow the movement of the active material. This makes it possible to reduce a situation in which the polymer particle or the active material migrates alone, and reduce deterioration in the electrical characteristics of the electrode.

The average particle size (DA) measured by using a dynamic light scattering method refers to the particle size (D50) at 50% in the cumulative particle size distribution (in which the light scattering intensity is sequentially integrated (accumulated) from particles having a small particle size to particles having a large particle size) measured by using a particle size distribution analyzer that utilizes a dynamic light scattering method as the measurement principle. Examples of such a particle size distribution analyzer include HORIBA LA-550 and HORIBA SZ-100 (manufactured by Horiba, Ltd.); FPAR-1000 (manufactured by Otsuka Electronics Co., Ltd.); and the like. These particle size distribution analyzers can measure the particle size distribution of the primary particles of the polymer, and can also measure the particle size distribution of the secondary particles that are formed by the aggregation of the primary particles. Therefore, the particle size distribution measured by these particle size distribution analyzers can be used as an index of the dispersion state of the polymer included in the binder composition. Note that the average particle size of the polymer particles may also be measured by centrifuging the slurry to precipitate the active material, and analyzing the supernatant liquid using the particle size distribution analyzer.

The average particle size (DB) of the polymer particles measured by TEM observation is preferably 50 to 400 nm, and more preferably 70 to 200 nm.

The average particle size (DB) of the polymer particles measured by TEM observation may be determined by calculating the average value of fifty particle sizes measured by using an image of the particles observed using a transmission electron microscope. Examples of the transmission electron microscope include H-7650 (manufactured by Hitachi High-Technologies Corporation), and the like.

1.1.2. Composition of Polymer (A)

It is preferable that the polymer (A) include a repeating unit (A1) derived from an unsaturated carboxylic acid in a ratio of 10 to 70 parts by mass, provided that the total amount of repeating units included in the polymer (A) is 100 parts by mass. This ensures that an acidic functional group such as a carboxyl group is present on the surface of the polymer particles. It is preferable that the polymer (A) include a repeating unit (A2) derived from a conjugated diene compound, a repeating unit (A3) derived from an aromatic vinyl compound, a repeating unit (A4) derived from an unsaturated carboxylic acid ester, and a repeating unit (A5) derived from an alpha,beta-unsaturated nitrile compound. Each repeating unit included in the polymer (A) is described in detail below.

1.1.2.1. Repeating Unit (A1) Derived From Unsaturated Carboxylic Acid

When the polymer (A) includes the repeating unit (A1) derived from an unsaturated carboxylic acid (hereinafter may be referred to as "repeating unit (A1)"), it is possible to produce a slurry (described later) in which the active material is advantageously dispersed without undergoing aggregation. Therefore, the active material layer formed by applying and drying the slurry has an almost uniform distribution, and it is possible to produce an electrical storage device electrode in which the number of binding defects is very small. Specifically, it is possible to remarkably improve the binding capability with respect to the active material, and the adhesion between the active material layer and the collector. Moreover, since the dispersion stability of the active material is improved, the storage stability of the slurry is improved.

Specific examples of the unsaturated carboxylic acid include a monocarboxylic acid and a dicarboxylic acid such as acrylic acid, methacrylic acid, crotonic acid, maleic acid, fumaric acid, and itaconic acid. The unsaturated carboxylic acid may be one or more compounds selected from these compounds. It is preferable that the polymer (A) include two or more types of repeating unit (A1) derived from an unsaturated carboxylic acid. It is more preferable that the polymer (A) include one or more repeating units derived from a monocarboxylic acid (e.g., acrylic acid and methacrylic acid), and one or more repeating units derived from a dicarboxylic acid (e.g., fumaric acid and itaconic acid). A monocarboxylic acid improves the effect of improving the binding capability with respect to the active material that includes a silicon material, and a dicarboxylic acid improves the effect of improving the adhesion between the active material layer and the collector. Therefore, the adhesion of the polymer (A) can be significantly improved by utilizing a monocarboxylic acid and a dicarboxylic acid in combination.

The polymer (A) preferably includes the repeating unit (A1) derived from an unsaturated carboxylic acid in a ratio of 10 to 70 parts by mass, more preferably 15 to 60 parts by mass, and particularly preferably 20 to 55 parts by mass, provided that the total amount of repeating units included in the polymer (A) is 100 parts by mass. When the polymer (A) includes the repeating unit (A1) in a ratio within the above range, it is possible to improve the binding capability with respect to the active material having a surface polar functional group (e.g., an active material that includes a silicon material), and improve the adhesion between the active material layer and the collector. Moreover, since the active material exhibits excellent dispersion stability when producing a slurry, aggregates are rarely formed, and an increase in viscosity of the slurry with the passing of time can be reduced.

If the polymer (A) includes the repeating unit (A1) in a ratio that is less than the above range, the binding capability with respect to the active material and the adhesion between the active material layer and the collector may be insufficient when the binder composition that includes the polymer (A) is used, and the capability to follow a change in volume (e.g., contraction and expansion) of the active material may deteriorate. As a result, the active material may be removed due to repeated charge and discharge, or cracks may occur in the active material layer (i.e., the electrode may deteriorate). Since the resulting polymer particles may easily aggregate, the binder composition may exhibit poor storage stability. If the polymer (A) includes the repeating unit (A1) in a ratio that exceeds the above range, the viscosity of the binder composition may significantly increase. In this case, since the viscosity of the slurry produced using the binder composition also significantly increases, it may be difficult to form a homogeneous active material layer. As a result, an excessive voltage may be applied to the active material layer in an inhomogeneous way (i.e., the active material layer may deteriorate), and the charge-discharge characteristics may deteriorate.

1.1.2.2. Repeating Unit (A2) Derived From Conjugated Diene Compound

When the polymer (A) includes the repeating unit (A2) derived from a conjugated diene compound (hereinafter may be referred to as "repeating unit (A2)"), it is possible to easily produce a polymer that exhibits excellent viscoelasticity and excellent strength. Specifically, the polymer (A) that includes the repeating unit derived from a conjugated diene compound exhibits a high binding capability. Since the rubber elasticity derived from the conjugated diene compound is provided to the polymer, the polymer can follow a change in volume (e.g., contraction and expansion) of the active material that includes a carbon material (e.g., graphite) or a silicon material. It is considered that the binding capability is thus further improved, and the charge-discharge durability characteristics are improved for a long time.

Examples of the conjugated diene compound include 1,3-butadiene, 2-methyl-1,3-butadiene, 2,3-dimethyl-1,3-butadiene, 2-chloro-1,3-butadiene, a substituted linear conjugated pentadiene, a substituted side-chain conjugated hexadiene, and the like. The conjugated diene compound may be one or more compounds selected from these compounds. It is particularly preferable to use 1,3-butadiene as the conjugated diene compound.

The polymer (A) preferably includes the repeating unit (A2) derived from a conjugated diene compound in a ratio of 15 to 50 parts by mass, more preferably 20 to 50 parts by mass, and particularly preferably 20 to 45 parts by mass, provided that the total amount of repeating units included in the polymer (A) is 100 parts by mass. When the polymer (A) includes the repeating unit (A2) in a ratio within the above range, it is possible to easily produce a polymer that exhibits excellent viscoelasticity and excellent strength.

When the mass of the repeating unit (A2) derived from a conjugated diene compound that is included in the polymer (A) is referred to as $W_{A2}$, and the mass of the repeating unit (A1) derived from an unsaturated carboxylic acid that is included in the polymer (A) is referred to as $W_{A1}$, it is preferable that the mass ratio "$W_{A1}/W_{A2}$" be 0.1 to 3.5, more preferably 0.2 to 3, and particularly preferably 0.3 to 2.7. When the mass ratio "$W_{A1}/W_{A2}$" is within the above range, it is possible to improve the balance between the binding capability with respect to the active material having a surface polar functional group (e.g., an active material that includes a carbon material (e.g., graphite) or a silicon material), and the adhesion between the active material layer and the collector.

1.1.2.3. Repeating Unit (A3) Derived From Aromatic Vinyl Compound

When the polymer (A) includes the repeating unit (A3) derived from an aromatic vinyl compound (hereinafter may be referred to as "repeating unit (A3)"), the polymer (A) has a moderate glass transition temperature (Tg). Therefore, the resulting active material layer exhibits moderate flexibility, and the adhesion between the collector and the active material layer is improved.

Specific examples of the aromatic vinyl compound include styrene, alpha-methylstyrene, p-methylstyrene, vinyltoluene, chlorostyrene, divinylbenzene, and the like. The aromatic vinyl compound may be one or more compounds selected from these compounds. It is particularly preferable to use styrene as the aromatic vinyl compound.

The polymer (A) preferably includes the repeating unit (A3) derived from an aromatic vinyl compound in a ratio of 10 to 60 parts by mass, more preferably 15 to 55 parts by mass, and particularly preferably 20 to 50 parts by mass, provided that the total amount of repeating units included in the polymer (A) is 100 parts by mass. When the polymer (A) includes the repeating unit (A3) in a ratio within the above range, the polymer (A) has a moderate glass transition temperature (Tg). This makes it possible to improve the binding capability with respect to the active material that includes a carbon material (e.g., graphite) or a silicon material. Moreover, the resulting active material layer exhibits improved flexibility and improved adhesion to the collector.

When the mass of the repeating unit (A2) derived from a conjugated diene compound that is included in the polymer (A) is referred to as $W_{A2}$, and the mass of the repeating unit (A3) derived from an aromatic vinyl compound that is included in the polymer (A) is referred to as $W_{A3}$, it is preferable that the mass ratio "$W_{A3}/W_{A2}$" be 0.3 to 1.5, more preferably 0.45 to 1.45, and particularly preferably 0.6 to 1.4. When the mass ratio "$W_{A3}/W_{A2}$" is within the above range, the hydrophobic component included in the polymer (A) exhibits moderate thermoplasticity, and the resulting active material layer exhibits better adhesion due to fusion of the polymer when the electrode is dried by heating (particularly when a carbon material (e.g., graphite) is used as the active material).

1.1.2.4. Repeating Unit (A4) Derived From Unsaturated Carboxylic Acid Ester

When the polymer (A) includes the repeating unit (A4) derived from an unsaturated carboxylic acid ester (hereinafter may be referred to as "repeating unit (A4)"), the polymer (A) exhibits good affinity to the electrolyte solution. This makes it possible to reduce or suppress an increase in internal resistance that may occur when the polymer (A) serves as an electrical resistance component in the electrical storage device. It is also possible to prevent a decrease in adhesion due to excessive absorption of the electrolyte solution.

When the polymer (A) includes the repeating unit (A5) derived from an alpha,beta-unsaturated nitrile compound (hereinafter may be referred to as "repeating unit (A5)"), the polymer (A) may have a high electrolyte solution swelling ratio, and the resistance of the electrode may decrease. On the other hand, the adhesion with respect to the active material, and the adhesion between the active material layer and the collector may decrease (i.e., the electrode structure may not be sufficiently maintained), and the charge-discharge characteristics may deteriorate. However, when the polymer (A) includes the repeating unit (A4) and the repeating unit (A5) in combination, the polymer (A) has a high electrolyte solution swelling ratio, the resistance of the electrode decreases, and the adhesion with respect to the active material, and the adhesion between the active material layer and the collector can be improved (i.e., the electrode structure can be sufficiently maintained) due to the synergistic effect of the repeating unit (A4) and the repeating unit (A5).

A (meth)acrylate is preferable as the unsaturated carboxylic acid ester. Specific examples of the (meth)acrylate include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, octyl (meth)acrylate, nonyl (meth)acrylate, decyl (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, ethylene di(meth)acrylate, and the like. The (meth)acrylate may be one or more compounds selected from these compounds.

Further examples of the (meth)acrylate include a compound represented by the following general formula (1).

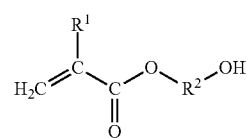

(1)

$R^1$ in the general formula (1) is a hydrogen atom or a monovalent hydrocarbon group. $R^1$ is preferably a monovalent hydrocarbon group, more preferably a substituted or unsubstituted alkyl group having 1 to 6 carbon atoms, and particularly a methyl group. $R^2$ is a divalent hydrocarbon group. $R^2$ is preferably a methylene group or a substituted or unsubstituted alkylene group having 2 to 6 carbon atoms. Specific examples of the compound represented by the general formula (1) include hydroxymethyl (meth)acrylate, hydroxyethyl (meth)acrylate, hydroxypropyl (meth)acrylate, hydroxybutyl (meth)acrylate, hydroxypentyl (meth)acrylate, hydroxyhexyl (meth)acrylate, and the like.

Among the (meth)acrylates mentioned above, methyl (meth)acrylate, ethyl (meth)acrylate, 2-ethylhexyl (meth) acrylate, hydroxymethyl (meth)acrylate, and hydroxyethyl (meth)acrylate are preferable, and methyl (meth)acrylate, hydroxymethyl (meth)acrylate, and hydroxyethyl (meth)

acrylate are particularly preferable. Note that these (meth) acrylate compounds may be used either alone or in combination.

The polymer (A) preferably includes the repeating unit (A4) derived from an unsaturated carboxylic acid ester in a ratio of 1 to 10 parts by mass, more preferably 2 to 10 parts by mass, and particularly preferably 5 to 10 parts by mass, provided that the total amount of repeating units included in the polymer (A) is 100 parts by mass. When the polymer (A) includes the repeating unit (A4) in a ratio within the above range, the polymer (A) exhibits better affinity for the electrolyte solution. This makes it possible to reduce or suppress an increase in internal resistance that may occur when the polymer (A) serves as an electrical resistance component in the electrical storage device. It is also possible to prevent a decrease in adhesion due to excessive absorption of the electrolyte solution.

1.1.2.5. Repeating Unit (A5) Derived From Alpha,Beta-Unsaturated Nitrile Compound When the polymer (A) includes the repeating unit (A5) derived from an alpha,beta-unsaturated nitrile compound, the polymer (A) moderately swells when exposed to the electrolyte solution described later. Specifically, since the electrolyte solution enters the network structure formed by the polymer chains due to the presence of a nitrile group, and the internetwork space increases, solvated lithium ions easily pass (move) through the network structure. It is considered that the diffusion capability of lithium ions is thus improved. As a result, the electrode exhibits excellent charge-discharge characteristics due to a decrease in resistance.

Specific examples of the alpha,beta-unsaturated nitrile compound include acrylonitrile, methacrylonitrile, alpha-chloroacrylonitrile, alpha-ethylacrylonitrile, vinylidene cyanide, and the like. The alpha,beta-unsaturated nitrile compound may be one or more compounds selected from these compounds. It is preferable to use one or more compounds selected from acrylonitrile and methacrylonitrile as the alpha,beta-unsaturated nitrile compound. It is more preferable to use acrylonitrile as the alpha,beta-unsaturated nitrile compound.

The polymer (A) preferably includes the repeating unit (A5) derived from an alpha,beta-unsaturated nitrile compound in a ratio of 1 to 10 parts by mass, more preferably 2 to 10 parts by mass, and particularly preferably 5 to 10 parts by mass, provided that the total amount of repeating units included in the polymer (A) is 100 parts by mass. When the polymer (A) includes the repeating unit derived from an alpha,beta-unsaturated nitrile compound within the above range, it is possible to produce a binder composition that exhibits better affinity for the electrolyte solution, exhibits better binding capability and strength, and exhibits mechanical characteristics and electrical characteristics in a well-balanced manner.

1.1.2.6. Additional Repeating Unit

The polymer (A) included in the binder composition according to one embodiment of the invention may include a repeating unit derived from a monomer that is copolymerizable with the compounds mentioned above in addition to the repeating units mentioned above.

Examples of the monomer that is copolymerizable with the compounds mentioned above include a fluorine-containing compound that includes an ethylenically unsaturated bond, such as vinylidene fluoride, tetrafluoroethylene, and hexafluoropropylene; an alkylamide of an ethylenically unsaturated carboxylic acid, such as (meth)acrylamide and N-methylolacrylamide; a vinyl carboxylate such as vinyl acetate and vinyl propionate; an ethylenically unsaturated dicarboxylic anhydride; an aminoalkylamide of an ethylenically unsaturated carboxylic acid, such as aminoethylacrylamide, dimethylaminomethylmethacrylamide, and methylaminopropylmethacrylamide; and the like. The monomer may be one or more compounds selected from these compounds.

1.1.3. Method for Synthesizing Polymer (A)

The polymer (A) may be synthesized using an arbitrary method. For example, the polymer (A) may be synthesized using an emulsion polymerization method in the presence of a known emulsifier (surfactant), chain transfer agent, initiator, and the like.

Specific examples of the emulsifier include an anionic surfactant such as a higher alcohol sulfate salt, an alkylbenzenesulfonate, an alkyl diphenyl ether disulfonate, an aliphatic sulfonate, an aliphatic carboxylate, a dehydroabietate, a naphthalenesulfonic acid-formalin condensate, and a sulfate salt of a nonionic surfactant; a nonionic surfactant such as a polyethylene glycol alkyl ester, a polyethylene glycol alkyl phenyl ether, and a polyethylene glycol alkyl ether; a fluorine-based surfactant such as a perfluorobutylsulfonate, a perfluoroalkyl group-containing phosphate, a perfluoroalkyl group-containing carboxylate, and a perfluoroalkyl ethylene oxide adduct; and the like. The emulsifier may be one or more compounds selected from these compounds.

Specific examples of the chain transfer agent include an alkylmercaptan such as n-hexylmercaptan, n-octylmercaptan, t-octylmercaptan, n-dodecylmercaptan, t-dodecylmercaptan, and n-stearylmercaptan; a xanthogen compound such as dimethylxanthogen disulfide and diisopropylxanthogen disulfide; a thiuram compound such as terpinolene, tetramethylthiuram disulfide, tetraethylthiuram disulfide, and tetramethylthiuram monosulfide; a phenol compound such as 2,6-di-t-butyl-4-methylphenol and styrenated phenol; an allyl compound such as allyl alcohol; a halogenated hydrocarbon compound such as dichloromethane, dibromomethane, and carbon tetrabromide; a vinyl ether compound such as alpha-benzyloxystyrene, alpha-benzyloxyacrylonitrile, and alpha-benzyloxyacrylamide; triphenylethane; pentaphenylethane; acrolein; methacrolein; thioglycolic acid; thiomalic acid; 2-ethylhexyl thioglycolate; an alpha-methylstyrene dimer; and the like. The chain transfer agent may be one or more compounds selected from these compounds.

Specific examples of the initiator include a water-soluble initiator such as lithium persulfate, potassium persulfate, sodium persulfate, and ammonium persulfate; an oil-soluble initiator such as cumene hydroperoxide, benzoyl peroxide, t-butyl hydroperoxide, acetyl peroxide, diisopropylbenzene hydroperoxide, 1,1,3,3-tetramethylbutyl hydroperoxide, azobisisobutyronitrile, and 1,1'-azobis(cyclohexanecarbonitrile); and the like. The initiator may be appropriately selected from these compounds. It is preferable to use potassium persulfate, sodium persulfate, cumene hydroperoxide, or t-butyl hydroperoxide as the initiator. It is also preferable to use a redox initiator obtained by combining an oxidizing agent and a reducing agent (e.g., persulfate and sodium bisulfite). The initiator may be used in an arbitrary amount. The initiator is used in an appropriate amount taking account of the monomer composition, the pH of the polymerization system, the type of additional additive, and the like.

The polymer (A) may be synthesized by one-step polymerization (emulsion polymerization), or may be synthesized by multi-step (two-step or higher-step) polymerization (emulsion polymerization). It is preferable to effect multi-step (two-step or higher-step) polymerization in order to obtain polymer particles that have such swelling properties that the ratio (DA/DB) falls within a range from 2 to 10.

When synthesizing the polymer (A) by one-step polymerization, the polymer (A) may be synthesized by subjecting a monomer mixture to emulsion polymerization preferably at 40 to 80° C. for 4 to 18 hours in the presence of an appropriate emulsifier, chain transfer agent, initiator, and the like.

When synthesizing the polymer (A) by two-step polymerization, the polymerization conditions in each step are preferably set as described below.

The ratio of the monomer that is subjected to first-step polymerization is preferably set to 40 to 95 mass %, and more preferably 45 to 90 mass %, based on the total mass of the monomer (i.e., the total of the mass of the monomer that is subjected to first-step polymerization and the mass of the monomer that is subjected to second-step polymerization). When the ratio of the monomer used that is subjected to first-step polymerization is within the above range, it is possible to obtain particles of the polymer (A) that exhibit excellent dispersion stability and rarely aggregate. It is also possible to reduce an increase in viscosity of the binder composition with the passing of time.

The type and the ratio of monomer that is subjected to first-step polymerization, and the type and the ratio of monomer that is subjected to second-step polymerization, may be either identical to or different from each other. When a monomer (e.g., alpha,beta-unsaturated nitrile compound) that has high reactivity with respect to a diene-based monomer is used, the polymerization reaction may proceed rapidly, and the heat of reaction may be produced suddenly, whereby it may be difficult to control the polymerization temperature. Therefore, it is preferable to subject 10 to 60 mass %, and more preferably 15 to 50 mass % of the monomer to second-step polymerization in order to more stably control the polymerization temperature.

It is preferable to subject a monomer mixture that includes an unsaturated carboxylic acid to second-step polymerization in order to synthesize polymer particles that have such swelling properties that the ratio (DA/DB) falls within a range from 2 to 10. The content of the unsaturated carboxylic acid in the monomer mixture that is subjected to second-step polymerization is preferably 50 mass % or more, more preferably 75 mass % or more, and particularly preferably 100 mass %. This makes it possible to increase the amount of acid present on the surface of the polymer particles, and easily synthesize polymer particles that have such swelling properties that the ratio (DA/DB) falls within a range from 2 to 10.

The polymerization conditions in each step are preferably set as described below from the viewpoint of the dispersibility of the resulting polymer.

First-step polymerization: temperature: preferably 40 to 80° C., polymerization time: preferably 2 to 24 hours, polymerization conversion rate: preferably 50 mass % or more, and more preferably 60 mass % or more Second-step polymerization: temperature: preferably 40 to 80° C., polymerization time: preferably 2 to 6 hours When the total solid content during emulsion polymerization is set to 50 mass % or less, the polymerization reaction proceeds so that the resulting polymer exhibits excellent dispersion stability. The total solid content during emulsion polymerization is preferably set to 45 mass % or less, and more preferably 40 mass % or less.

When synthesizing the polymer (A) by one-step polymerization or two-step polymerization, it is preferable to adjust the pH of the polymerization mixture to about 3 to 6, preferably 3.5 to 5.5, and more preferably 4 to 5, after completion of emulsion polymerization by adding a neutralizer to the polymerization mixture. The neutralizer is not particularly limited. Examples of the neutralizer include a metal hydroxide such as sodium hydroxide and potassium hydroxide; ammonia; and the like. The dispersion stability of the polymer (A) is improved by setting the pH of the polymerization mixture within the above range. The neutralized polymerization mixture may be concentrated to increase the solid content in the polymerization mixture while maintaining the stability of the polymer (A).

1.1.4. Properties of Polymer (A)

1.1.4.1. Tetrahydrofuran (THF)-Insoluble Content

The THF-insoluble content in the polymer (A) is preferably 75 mass % or more, and more preferably 80 mass % or more. It was experimentally confirmed that the THF-insoluble content is almost proportional to the content of components that are insoluble in the electrolyte solution used for the electrical storage device. Therefore, when an electrical storage device is produced using the polymer (A) having a THF-insoluble content within the above range, elution of the polymer (A) into the electrolyte solution can be suppressed even when the electrical storage device is repeatedly charged and discharged for a long time.

1.1.4.2. Glass Transition Temperature (Tg)

It is preferable that the polymer (A) have only one endothermic peak within a temperature range from −40 to +30° C. when subjected to differential scanning calorimetry (DSC) in accordance with JIS K 7121. It is more preferable that the polymer (A) have only one endothermic peak (i.e., glass transition temperature (Tg)) within a temperature range from −30 to +25° C., and still more preferably within a temperature range from −25 to +20° C. When the polymer (A) has only one endothermic peak within the above temperature range when subjected to DSC, the polymer (A) exhibits excellent binding capability, and can provide the active material layer with better flexibility and adhesion.

1.2. Liquid Medium (B)

The binder composition according to one embodiment of the invention includes the liquid medium (B). The liquid medium (B) is preferably an aqueous medium that includes water. The aqueous medium may include a non-aqueous medium other than water. Examples of the non-aqueous medium include an amide compound, a hydrocarbon, an alcohol, a ketone, an ester, an amine compound, a lactone, a sulfoxide, a sulfone compound, and the like. The non-aqueous medium may be one or more compounds selected from these compounds. When the aqueous medium is used as the liquid medium (B), the binder composition according to one embodiment of the invention has a low impact on the environment, and is highly safe for the operator.

The aqueous medium preferably includes the non-aqueous medium in a ratio of 10 parts by mass or less, and more preferably 5 parts by mass or less based on 100 parts by mass of the aqueous medium. It is particularly preferable that the aqueous medium substantially does not include the non-aqueous medium. The expression "substantially does not include" used herein in connection with the non-aqueous medium means that the non-aqueous medium is not intentionally added as the liquid medium. Therefore, the liquid medium (B) may include a non-aqueous medium that is inevitably mixed in the liquid medium (B) when the binder composition is produced.

1.3. Additive

The binder composition according to one embodiment of the invention may optionally include an additive in addition to the polymer (A) and the liquid medium (B). Examples of the additive include a polymer other than the polymer (A), a preservative, a thickener, and the like.

<Polymer Other than Polymer (A)>

The polymer other than the polymer (A) may be selected taking account of the type of active material included in the slurry so as to improve binding capability to the active material, for example. Examples of the polymer other than the polymer (A) include poly(meth)acrylic acid, poly(meth)acrylamide, polyvinylpyrrolidone, an acrylic emulsion, a styrene-butadiene copolymer latex, and the like. When the polymer other than the polymer (A) is added to the binder composition according to one embodiment, the polymer other than the polymer (A) is preferably added so that the mass ratio "polymer (A):polymer other than polymer (A)" is 1:99 to 80:20.

<Preservative>

When the binder composition according to one embodiment of the invention includes the preservative, it is possible to reduce a problem in which bacteria, mold, and the like grow in the binder composition during storage to produce a foreign substance.

A known preservative may be used as the preservative. Examples of the preservative include 1,2-benzisothiazolin-3-one, 2-methyl-4,5-trimethylene-4-isothiazolin-3-one, 2-methyl-4-isothiazolin-3-one, 5-chloro-2-methyl-4-isothiazolin-3-one, N-n-butyl-1,2-benzisothiazolin-3-one, 2-n-octyl-4-isothiazolin-3-one, 4,5-dichloro-2-n-octyl-4-isothiazolin-3-one, and the like. The preservative may be one or more compounds selected from these compounds. Among these, 2-methyl-4-isothiazolin-3-one, 2-n-octyl-4-isothiazolin-3-one, 5-chloro-2-methyl-4-isothiazolin-3-one, and 1,2-benzisothiazolin-3-one are preferable.

When the binder composition according to one embodiment of the invention includes the preservative, the content of the preservative in the binder composition is preferably 50 ppm or more and less than 200 ppm, and more preferably 50 to 150 ppm, provided that the total amount of solid included in the binder composition is 100 parts by mass.

<Thickener>

When the binder composition according to one embodiment of the invention includes the thickener, it is possible to further improve the applicability of the binder composition, the charge-discharge characteristics of the resulting electrical storage device, and the like.

Examples of the thickener include a cellulose compound such as carboxymethyl cellulose, methyl cellulose, and hydroxypropyl cellulose; an ammonium salt or an alkali metal salt of the cellulose compound; a polyvinyl alcohol-based (co)polymer such as polyvinyl alcohol, a modified polyvinyl alcohol, and an ethylene-vinyl alcohol copolymer; a water-soluble polymer such as a saponified product of a copolymer of an unsaturated carboxylic acid (e.g., (meth)acrylic acid, maleic acid, or fumaric acid) and a vinyl ester; and the like. It is particularly preferable to use an alkali metal salt of carboxymethyl cellulose, an alkali metal salt of poly(meth)acrylic acid, or the like as the thickener.

Examples of commercially-available products of these thickeners include CMC1120, CMC1150, CMC2200, CMC2280, CMC2450 (alkali metal salt of carboxymethyl cellulose) (manufactured by Daicel Corporation); and the like.

When the binder composition according to one embodiment of the invention includes the thickener, the thickener is preferably used in a ratio of 5 parts by mass or less, and more preferably 0.1 to 3 parts by mass, provided that the total amount of solid included in the binder composition is 100 parts by mass.

1.4. Properties of Binder Composition 1.4.1. pH

The pH of the electrical storage device electrode binder composition according to one embodiment of the invention is preferably 3 to 6, more preferably 3.5 to 5.5, and particularly preferably 3.5 to 5. When the pH of the electrical storage device electrode binder composition is within the above range, it is possible to reduce the occurrence of deterioration in leveling properties, dripping, and the like, and easily produce an electrode that exhibits excellent electrical characteristics and excellent binding capability.

The term "pH" used herein refers to a value measured at 25° C. in accordance with JIS Z 8802:2011 using a pH meter that utilizes a glass electrode calibrated using a neutral phosphate standard solution and a borate standard solution. Examples of the pH meter include HM-7J (manufactured by DKK-TOA Corporation), D-51 (manufactured by Horiba Ltd.), and the like.

A slurry produced using the electrical storage device electrode binder composition having a pH within the above range has an advantage in that the surface of the active material is corroded due to a low pH to such an extent that deterioration in charge-discharge characteristics does not occur, so that the surface of the active material that has been exposed to air and contaminated can be cleaned. It is considered that this makes it possible to reduce a situation in which occlusion and release of lithium ions are hindered between the active material (active material layer) and the electrolyte solution, and achieve excellent charge-discharge characteristics.

Note that the pH of the electrical storage device electrode binder composition may be affected by the monomer composition of the polymer (A), but is not determined by only the monomer composition. Specifically, it is known that the pH of an electrical storage device electrode binder composition changes depending on the polymerization conditions and the like even when an identical monomer composition is used. The examples disclosed herein illustrate mere examples of such a phenomenon.

For example, the amount of carboxylic acid derived from an unsaturated carboxylic acid that is exposed on the surface of the resulting electrical storage device electrode binder composition differs between a case where the entirety of the unsaturated carboxylic acid is initially added to the polymerization reaction mixture, and an additional monomer is sequentially added to the polymerization reaction mixture, and a case where the unsaturated carboxylic acid is added to the polymerization solution after adding a monomer other than the unsaturated carboxylic acid to the polymerization reaction mixture, even when an identical monomer composition is used. It is considered that the pH of the electrical storage device electrode binder composition varies to a large extent even when only the order in which the monomers are added is changed.

1.4.2. Electrolyte Solution Swelling Ratio

The electrolyte solution swelling ratio of the electrical storage device electrode binder composition according to one embodiment of the invention is preferably 100 to 130%, more preferably 105 to 125%, and particularly preferably 110 to 120%. When the electrolyte solution swelling ratio is within the above range, the polymer particles moderately swell in the electrolyte solution. As a result, solvated lithium ions easily reach the active material, and the resistance of the electrode is effectively reduced to implement excellent charge/discharge characteristics. Moreover, since a large change in volume does not occur, an excellent binding capability is obtained.

The electrolyte solution swelling ratio of the binder composition according to one embodiment of the invention is calculated as described below.

The binder composition is poured into a given mold, and dried at room temperature to obtain a dry film. The dry film is removed from the mold, and dried at 160° C. for 0.5 hours to obtain a test film. The test film (W0 (g)) is immersed in a standard electrolyte solution, and heated at 70° C. for 1 day to swell the test film. After removing the test film from the standard electrolyte solution, the electrolyte solution that adheres to the surface of the test film is wiped off, and the post-immersion mass (W1 (g)) is measured. The electrolyte solution swelling ratio (%) is calculated by the following expression (2) using the above values.

Electrolyte solution swelling ratio (%)=(W1/W0)× 100     (2)

Note that the term "standard electrolyte solution" used herein refers to an electrolyte solution prepared by dissolving $LiPF_6$ (electrolyte) (concentration: 1 M) in a mixed solvent prepared by mixing propylene carbonate (PC) and diethyl carbonate (DEC) in a volume ratio of 5:5.

2. Electrical Storage Device Electrode Slurry

An electrical storage device electrode slurry according to one embodiment of the invention may be produced using the binder composition described above. The term "electrical storage device electrode slurry" used herein refers to a dispersion that is used to form an active material layer on the surface of a collector. The electrical storage device electrode slurry according to one embodiment of the invention includes the binder composition described above, and an active material. Each material included in the electrical storage device electrode slurry according to one embodiment of the invention is described below. Note that the binder composition is the same as described above, and description thereof is omitted.

2.1. Active Material

Examples of the active material that is used to produce the electrical storage device electrode slurry according to one embodiment of the invention include a carbon material, a silicon material, a lithium atom-containing oxide, a lead compound, a tin compound, an arsenic compound, an antimony compound, an aluminum compound, and the like.

Examples of the carbon material include amorphous carbon, graphite, natural graphite, mesocarbon microbeads (MCMB), pitch-based carbon fibers, and the like.

Examples of the silicon material include silicon, a silicon oxide, a silicon alloy, silicon oxide complexes represented by SiC, $SiO_xC_y$ (0<x≤3, 0<y≤5), $Si_3N_4$, $Si_2N_2O$, and $SiO_x$ (0<x≤2) (e.g., the materials disclosed in JP-A-2004-185810 and JP-A-2005-259697), and the silicon materials disclosed in JP-A-2004-185810. A silicon oxide represented by $SiO_x$ (0<x<2 (preferably 0.1≤x≤1)) is preferable as the silicon oxide. An alloy of silicon and at least one transition metal selected from the group consisting of titanium, zirconium, nickel, copper, iron, and molybdenum, is preferable as the silicon alloy. Alloys of silicon and these transition metals have high electron conductivity, and exhibit high strength. When the active material includes these transition metals, the transition metal present on the surface of the active material is oxidized to form an oxide having a surface hydroxyl group, and the binding capability with respect to the binder is further improved. It is preferable to use a silicon-nickel alloy or a silicon-titanium alloy as the silicon alloy. It is particularly preferable to use a silicon-titanium alloy as the silicon alloy. The silicon content in the silicon alloy is preferably 10 mol % or more, and more preferably 20 to 70 mol %, based on the total amount of metal elements included in the silicon alloy. Note that the silicon material may be a single crystal silicon material, a polycrystalline silicon material, or an amorphous silicon material.

The lithium atom-containing oxide may be one or more compounds selected from a lithium atom-containing oxide that is represented by the following general formula (3) and has an olivine-type crystal structure (olivine-type lithium-containing phosphoric acid compound), for example.

$$Li_{1-x}M_x(AO_4) \quad (3)$$

wherein M is an ion of at least one metal selected from the group consisting of Mg, Ti, V, Nb, Ta, Cr, Mn, Fe, Co, Ni, Cu, Zn, Al, Ga, Ge, and Sn, A is at least one element (atom) selected from the group consisting of Si, S, P, and V, and x is a number that satisfies 0<x<1.

Note that x in the general formula (3) is selected taking account of the valence of M and A so that the valence of the lithium atom-containing oxide represented by the general formula (3) is 0.

Examples of the olivine-type lithium-containing phosphoric acid compound include lithium cobaltate, lithium nickelate, lithium manganate, lithium nickel cobalt manganate, $LiFePO_4$, $LiCoPO_4$, $LiMnPO_4$, $Li_{0.90}Ti_{0.05}Nb_{0.05}Fe_{0.30}Co_{0.30}Mn_{0.30}PO_4$, and the like. Among these, $LiFePO_4$ (lithium iron phosphate) is preferable since an iron compound used as the raw material is easily available and is inexpensive.

The average particle size of the olivine-type lithium-containing phosphoric acid compound is preferably 1 to 30 micrometers, more preferably 1 to 25 micrometers, and particularly preferably 1 to 20 micrometers.

The active material layer may include a conductive polymer such as polyacene; a complex metal oxide represented by $A_xB_yO_Z$ (wherein A is an alkali metal or a transition metal, B is at least one metal selected from a transition metal such as cobalt, nickel, aluminum, tin, and manganese, O is an oxygen atom, and X, Y, and Z are numbers that satisfy 1.10>X>0.05, 4.00>Y>0.85, and 5.00>Z>1.5); a metal oxide other than the complex metal oxide represented by $A_xB_yO_Z$; and the like.

The electrical storage device electrode slurry according to one embodiment of the invention may be used to produce the positive electrode and the negative electrode of the electrical storage device. The electrical storage device electrode slurry according to one embodiment of the invention is preferably used to produce both the positive electrode and the negative electrode of the electrical storage device.

When producing the positive electrode, it is preferable to use the lithium atom-containing oxide, more preferably the olivine-type lithium-containing phosphoric acid compound, and particularly preferably lithium iron phosphate ($LiPO_4$), as the active material. Lthium iron phosphate is preferable since an iron compound used as the raw material is easily available and is inexpensive.

When lithium iron phosphate is used as the positive electrode active material, it is known that sufficient charge-discharge characteristics may not be obtained, and binding capability may be poor. It is known that lithium iron phosphate has a small primary particle size, and forms a secondary aggregate. The aggregate breaks within the active material layer due to repeated charge and discharge, whereby removal (separation) from the collector occurs, or the conductive network within the active material layer easily breaks.

However, the electrical storage device electrode produced using the electrical storage device electrode slurry according to one embodiment of the invention is free from the above problem, and exhibits excellent electrical characteristics, even when lithium iron phosphate is used. This is considered to be because the polymer (A) can strongly bind lithium iron phosphate, and can maintain a state in which lithium iron phosphate is strongly bound even during charge and discharge.

When producing the negative electrode, it is preferable to use a material that includes the silicon material as the active material. Since the silicon material has a large lithium occlusion capacity per unit weight as compared with other active materials, the electrical storage capacity of the resulting electrical storage device can be improved when the active material includes the silicon material. This makes it possible to improve the output and the energy density of the electrical storage device.

It is more preferable that the active material that is used to produce the negative electrode be a mixture that includes the silicon material and the carbon material. Since the carbon material shows a small change in volume due to charge and discharge, it is possible to reduce the effects of a change in volume of the silicon material by utilizing a mixture that includes the silicon material and the carbon material as the active material that is used to produce the negative electrode, and further improve the adhesion between the active material layer and the collector. A carbon-coated silicon material in which a film formed of the carbon material is provided on the surface of the silicon material, may be used as the mixture that includes the silicon material and the carbon material. When the carbon-coated silicon material is used, it is possible to effectively reduce the effects of a change in volume of the silicon material due to charge and discharge by means of the carbon material formed on the surface of the silicon material, and easily improve the adhesion between the active material layer and the collector.

When silicon (Si) is used as the active material, silicon can occlude up to twenty-two lithium atoms per five silicon atoms ($5Si+22Li \rightarrow Li_{22}Si_5$). Therefore, the theoretical capacity of silicon reaches 4,200 mAh/g. However, silicon significantly changes in volume when occluding lithium. Specifically, while a carbon material expands by a factor of up to about 1.2 as a result of occluding lithium, a silicon material expands by a factor of up to about 4.4 as a result of occluding lithium. Therefore, a silicon material produces a fine powder, and causes removal (separation) from the collector and separation of the active material as a result of repeated expansion and contraction, and the conductive network in the active material layer easily breaks. Accordingly, the cycle characteristics significantly deteriorate within a short time.

However, the electrical storage device electrode produced using the electrical storage device electrode slurry according to one embodiment of the invention is free from the above problem, and exhibits excellent electrical characteristics, even when the silicon material is used. This is considered to be because the polymer (A) can strongly bind the silicon material, and expand and contract when the silicon material has expanded as a result of occluding lithium to maintain a state in which the silicon material is strongly bound.

The content of the silicon material in the active material (=100 mass %) is preferably 1 mass % or more, more preferably 1 to 50 mass %, still more preferably 5 to 45 mass %, and particularly preferably 10 to 40 mass %, from the viewpoint of the balance between an improvement in the output and the energy density of the electrical storage device and the charge-discharge durability characteristics.

When the silicon material and the carbon material are used in combination as the active material, the silicon material is preferably used in a ratio of 4 to 40 parts by mass, more preferably 5 to 35 parts by mass, and particularly preferably 5 to 30 parts by mass, provided that the total mass of the active material is 100 parts by mass, from the viewpoint of maintaining a sufficient binding capability. When the silicon material is used in a ratio within the above range, the volume expansion of the carbon material due to occlusion of lithium is smaller than that of the silicon material, and it is possible to reduce a change in volume of the active material layer (that includes the carbon material and the silicon material) due to charge and discharge, so that the adhesion between the collector and the active material layer can be further improved.

It is preferable that the active material be in the shape of particles. The average particle size of the active material is preferably 0.1 to 100 micrometers, and more preferably 1 to 20 micrometers.

Note that the average particle size of the active material refers to the volume average particle size calculated from the particle size distribution measured by using a particle size distribution analyzer that utilizes a laser diffraction method as the measurement principle. Examples of such a laser diffraction particle size distribution analyzer include a HORIBA LA-300 series and a HORIBA LA-920 series (manufactured by Horiba, Ltd.); and the like. These particle size distribution analyzers can measure the particle size distribution of the primary particles of the active material, and can also measure the particle size distribution of the secondary particles that are formed by the aggregation of the primary particles. Therefore, the average particle size measured by using these particle size distribution analyzers can be used as an index of the dispersion state of the active material included in the electrical storage device electrode slurry. The average particle size of the active material may also be measured by centrifuging the slurry to precipitate the active material, removing the supernatant liquid, and analyzing the active material as described above.

The active material is preferably used in such a ratio that the ratio of the polymer (A) is 0.1 to 25 parts by mass, and more preferably 0.5 to 15 parts by mass, based on 100 parts by mass of the active material. When the active material is used in a ratio within the above range, it is possible to produce an electrode that exhibits better binding capability, has low resistance, and exhibits better charge-discharge characteristics.

2.2. Additive

The electrical storage device electrode slurry according to one embodiment of the invention may optionally include an additional component in addition to the above components. Examples of the additional component include a conductivity-imparting agent, a thickener, a liquid medium (excluding the liquid medium included in the binder composition), and the like.

2.2.1. Conductivity-Imparting Agent

Specific examples of the conductivity-imparting agent used for a lithium-ion secondary battery include carbon and the like. Examples of the carbon include activated carbon, acetylene black, Ketjen black, furnace black, graphite, carbon fibers, a fullerene, and the like. Among these, acetylene black and furnace black may preferably be used. The conductivity-imparting agent is preferably used in a ratio of 20 parts by mass or less, more preferably 1 to 15 parts by mass, and particularly preferably 2 to 10 parts by mass, based on 100 parts by mass of the active material.

2.2.2. Thickener

A thickener may be added to the electrical storage device electrode slurry in order to improve the applicability of the electrical storage device electrode slurry. Specific examples of the thickener include a cellulose derivative such as carboxymethyl cellulose, methyl cellulose, ethyl cellulose, hydroxymethyl cellulose, hydroxypropylmethyl cellulose, and hydroxyethylmethyl cellulose; ammonium salts and alkali metal salts of these cellulose derivatives; a polycarboxylic acid such as poly(meth)acrylic acid and a modified poly(meth)acrylic acid; alkali metal salts of these polycarboxylic acids; a polyvinyl alcohol-based (co)polymer such as polyvinyl alcohol, a modified polyvinyl alcohol, and an ethylene/vinyl alcohol copolymer; a water-soluble polymer such as a saponified product of a copolymer of a vinyl ester and an unsaturated carboxylic acid (e.g., (meth)acrylic acid, maleic acid, or fumaric acid); and the like. The thickener is preferably used in a ratio of 0.1 to 10 parts by mass, and more preferably 0.5 to 5 parts by mass, based on 100 parts by mass of the active material.

2.2.3. Liquid Medium

Since the electrical storage device electrode slurry according to one embodiment of the invention includes the binder composition described above, the electrical storage device electrode slurry includes the liquid medium (B) that is included in the binder composition. The electrical storage device electrode slurry according to one embodiment of the invention may optionally include an additional liquid medium in addition to the liquid medium (B) that is included in the binder composition.

The additional liquid medium that may be added to the electrical storage device electrode slurry according to one embodiment of the invention may be the same as or different from the liquid medium (B) that is included in the binder composition. It is preferable to select the additional liquid medium from the liquid media described above in connection with the liquid medium (B) that is included in the binder composition.

The additional liquid medium is preferably used so that the solid content in the electrical storage device electrode slurry according to one embodiment of the invention (i.e., the ratio of the total mass of the components other than the liquid medium in the slurry to the total mass of the slurry (hereinafter the same)) is 30 to 70 mass %, and more preferably 40 to 60 mass %.

2.3. Method for Producing Electrical Storage Device Electrode Slurry

The electrical storage device electrode slurry according to one embodiment of the invention may be produced using an arbitrary method as long as the electrical storage device electrode slurry includes the binder composition and the active material.

It is preferable to produce the electrical storage device electrode slurry by adding the active material and an optional additive component to the binder composition, and mixing the mixture, in order to more efficiently and inexpensively produce a slurry that exhibits better dispersibility and stability. The binder composition, the active material, and an optional additive component may be mixed by stirring the mixture using a known method.

When producing the electrical storage device electrode slurry by mixing and stirring the components, it is necessary to appropriately select a mixer that can stir the components so that aggregates of the active material particles do not remain in the resulting slurry, and select necessary and sufficient dispersion conditions. The degree of dispersion can be measured by using a grind gauge. It is preferable to mix and disperse the components so that the resulting slurry does not include aggregates having a size of larger than 100 micrometers. Examples of the mixer that meets the above conditions include a ball mill, a bead mill, a sand mill, a deaerator, a pigment disperser, a grinder, an ultrasonic disperser, a homogenizer, a planetary mixer, a Hobart mixer, and the like.

It is preferable to perform at least part of the electrical storage device electrode slurry production process (i.e., component mixing operation) under reduced pressure. This makes it possible to prevent a situation in which bubbles are formed in the resulting active material layer. It is preferable to mix the components under a reduced pressure (absolute pressure) of about $5.0 \times 10^3$ to $5.0 \times 10^5$ Pa.

3. Electrical Storage Device Electrode

An electrical storage device electrode according to one embodiment of the invention includes a collector, and a layer that is formed on the surface of the collector by applying the electrical storage device electrode slurry described above to the surface of the collector, and drying the applied electrical storage device electrode slurry. The electrical storage device electrode according to one embodiment of the invention may be produced by applying the electrical storage device electrode slurry described above to the surface of the collector (e.g., metal foil) to form a film, and drying the film to form an active material layer. The electrical storage device electrode thus produced has a structure in which the active material layer that includes the polymer (A), the active material, and an optional additional component, is bonded to the collector. The electrical storage device electrode exhibits excellent adhesion and excellent charge-discharge characteristics.

The collector is not particularly limited as long as the collector is formed of a conductive material. A collector that is formed of a metal (e.g., iron, copper, aluminum, nickel, or stainless steel) is used for a lithium-ion secondary battery. The advantageous effects of the electrical storage device electrode slurry that is produced using the binder composition described above are most effectively achieved when aluminum is used for the positive electrode, and copper is used for the negative electrode. A collector that is formed of a perforated metal, an expanded metal, wire gauze, a foam metal, sintered metal fibers, a metal-plated resin sheet, or the like is used for a nickel-hydrogen secondary battery. The shape and the thickness of the collector are not particularly limited. It is preferable to use a sheet-like collector having a thickness of about 0.001 to 0.5 mm.

The electrical storage device electrode slurry may be applied to the collector using an arbitrary method. For example, the electrical storage device electrode slurry may be applied to the collector using a doctor blade method, a dipping method, a reverse roll method, a direct roll method, a gravure method, an extrusion method, an immersion method, a brush coating method, or the like. The electrical storage device electrode slurry may be applied to the collector in an arbitrary amount. It is preferable to apply the electrical storage device electrode slurry to the collector so that the active material layer that is formed by removing the liquid medium has a thickness of 0.005 to 5 mm, and more preferably 0.01 to 2 mm. When the thickness of the active material layer is within the above range, the electrolyte solution can be effectively absorbed in the active material layer. As a result, metal ions are easily transferred between the active material included in the active material layer and the electrolyte solution due to charge and discharge, and the resistance of the electrode can be further reduced. Moreover, when the thickness of the active material layer is within the above range, it is possible to easily obtain an electrical storage device electrode that ensures that the active material layer is not removed (separated) from the collector (i.e., exhibits excellent adhesion) even when the electrode is folded or wound, for example, and exhibits excellent flexibility.

The film formed by applying the electrical storage device electrode slurry may be dried by removing the liquid medium (i.e., water and an optional non-aqueous medium may be removed) using an arbitrary method. For example, the film may be dried using warm air, hot air, or low humid air, or may be dried under vacuum, or may be dried by applying (far) infrared radiation, electron beams, or the like. The drying speed may be appropriately set so that the liquid medium can be removed as quickly as possible while preventing a situation in which cracks occur in the active material layer due to stress concentration, or the active material layer is removed from the collector.

It is preferable to increase the density of the active material layer by pressing the film after removing the liquid medium, for example. The film may be pressed using a die press method, a roll press method, or the like. The press conditions are appropriately set taking account of the type of press and the desired density of the active material layer. The press conditions can be easily set by a person having ordinary skill in the art by performing some preliminary experiments. When a roll press is used, the linear pressure of the roll press may be set to 0.1 to 10 t/cm, and preferably 0.5 to 5 t/cm, the roll temperature may be set to 20 to 100° C., and the feed speed (roll rotational speed) of the film (from which the liquid medium has been removed) may be set to 1 to 80 m/min, and preferably 5 to 50 m/min.

The density of the active material layer after pressing is preferably 1.5 to 4.0 g/cm$^3$, and more preferably 1.7 to 3.8 g/cm$^3$, when the resulting electrode is used as the positive electrode. The density of the active material layer after pressing is preferably 1.2 to 1.9 g/cm$^3$, and more preferably 1.3 to 1.8 g/cm$^3$, when the resulting electrode is used as the negative electrode.

It is preferable to heat the pressed film under reduced pressure to completely remove the liquid medium. The pressure (absolute pressure) is preferably set to 50 to 200 Pa, and more preferably 75 to 150 Pa. The heating temperature is preferably set to 100 to 200° C., and more preferably 120 to 180° C. The heating time is preferably set to 2 to 12 hours, and more preferably 4 to 8 hours.

The electrical storage device electrode thus produced exhibits excellent adhesion and excellent charge-discharge characteristics.

When the silicon material is used as the active material that is used to produce the electrical storage device electrode according to one embodiment of the invention, it is preferable that the silicon content in the active material layer be 2 to 30 parts by mass, more preferably 2 to 20 parts by mass, and particularly preferably 3 to 10 parts by mass, based on 100 parts by mass of the active material layer. When the silicon content in the active material layer is within the above range, the electrical storage capacity of the resulting electrical storage device is improved, and an active material layer having a uniform silicon distribution is obtained. If the silicon content in the active material layer is less than the above range, the electrical storage capacity of the resulting electrical storage device may decrease. If the silicon content in the active material layer exceeds the above range, the electrical storage capacity of the resulting electrical storage device is improved, but the active material layer may be easily removed from the electrode due to repeated charge and discharge, and the electrode may deteriorate. Moreover, the silicon-containing component may easily aggregate, and the active material layer may have a non-uniform silicon distribution. As a result, the active material layer may exhibit an inferior binding/bonding capability, and the fall-off resistance may become insufficient.

The silicon content in the active material layer may be measured as described below.

(1) The silicon content in a sample having a known silicon content is measured at a plurality of points using an X-ray fluorescence spectrometer ("PANalytical Magix PRO" manufactured by Spectris Co., Ltd.), and a calibration curve is drawn.

(2) 3 g of the active material layer is scraped off (thoroughly in the depth direction) from the electrical storage device electrode using a spatula or the like, uniformly mixed using a mortar or the like, and pressed in the shape of a disc-like plate having a diameter of 3 cm. When it is difficult to form the active material layer alone, an adhesive having a known elemental composition may be appropriately used. Examples of the adhesive include a styrene-maleic acid resin, a boric acid powder, a cellulose powder, and the like. When the silicon content is high, and it is difficult to ensure that the calibration curve has linearity, the sample may be diluted using the adhesive. When the adhesive is used, it is preferable to also use the adhesive for the sample for drawing the calibration curve in order to prevent a shift in the calibration curve due to a matrix effect.

(3) The resulting plate is analyzed using the X-ray fluorescence spectrometer, and the silicon content is calculated using the calibration curve. When the adhesive is used, the silicon content is calculated after subtracting the weight of the adhesive.

4. Electrical Storage Device

An electrical storage device according to one embodiment of the invention includes the electrical storage device electrode described above, and an electrolyte solution, and may be produced according to an ordinary method using a separator and the like. More specifically, the electrical storage device may be produced by placing a negative electrode on a positive electrode through a separator to form a laminate, rolling or folding the laminate in the shape of a battery, placing the laminate in a battery casing, injecting an electrolyte solution into the battery casing, and sealing the battery casing, for example. The battery may have an arbitrary shape (e.g., coin-like shape, cylindrical shape, square shape, or laminate-like shape).

The electrolyte solution may be in the form of a liquid or a gel. The electrolyte solution may be selected from known electrolyte solutions used for an electrical storage device taking account of the type of the active material so that the function of the battery is effectively achieved. The electrolyte solution may be a solution prepared by dissolving an electrolyte in an appropriate solvent.

An arbitrary known lithium salt may be used as the electrolyte used when producing a lithium-ion secondary battery. Specific examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9SO_3$, $Li(CF_3SO_2)_2N$, a lithium lower aliphatic carboxylate, and the like. When producing a nickel-hydrogen secondary battery, a potassium hydroxide aqueous solution (concentration: 5 mol/L or more) may be used as the electrolyte solution, for example.

The solvent that is used to dissolve the electrolyte is not particularly limited. Specific examples of the solvent include a carbonate compound such as propylene carbonate, ethylene carbonate, butylene carbonate, dimethyl carbonate, methylethyl carbonate, and diethyl carbonate; a lactone compound such as gamma-butyrolactone; an ether compound such as trimethoxymethane, 1,2-dimethoxyethane, diethyl ether, 2-ethoxyethane, tetrahydrofuran, and 2-methyltetrahydrofuran; a sulfoxide compound such as dimethyl sulfoxide; and the like. The solvent may be one or more compounds selected from these compounds. The concentration of the electrolyte in the electrolyte solution is preferably 0.5 to 3.0 mol/L, and more preferably 0.7 to 2.0 mol/L.

5. Examples

The invention is further described below by way of examples. Note that the invention is not limited to the following examples. The units "parts" and "%" used in connection with the examples and the comparative examples respectively refer to "parts by mass" and "mass %" unless otherwise indicated.

5.1. Example 1

5.1.1. Production and Evaluation of Binder Composition (1) Production of Binder Composition A binder composition including particles of the polymer (A) was produced as described below by means of two-step polymerization. A reactor was charged with 211 parts by mass of water, 79 parts by mass of a monomer mixture (including 32 parts by mass of 1,3-butadiene, 42 parts by mass of styrene, 2 parts by mass of methacrylic acid, and 3 parts by mass of acrylic acid), 0.1 parts by mass of t-dodecylmercaptan (chain transfer agent), 1 part by mass of a sodium alkyl diphenyl ether disulfonate (emulsifier), and 0.2 parts by mass of potassium persulfate (initiator). Polymerization was effected at 60° C. for 18 hours with stirring. The reaction was terminated when the polymerization conversion rate reached 96% (first-step polymerization). Next, the reactor was charged with 189 parts by mass of water, 21 parts by mass of methacrylic acid, 0.05 parts by mass of potassium persulfate (initiator), and 0.1 parts by mass of sodium carbonate. After effecting polymerization at 80° C. for 2 hours, the reaction was terminated (second-step polymerization). The polymerization conversion rate was 98%. After removing unreacted monomers from the resulting latex (dispersion) including the polymer (A) in the form of particles, the solid content in the dispersion and the pH of the dispersion were adjusted by adding a 10% sodium hydroxide aqueous solution and water to obtain a binder composition (pH: 4.4) including the polymer (A) in the form of particles in a ratio of 20%.

(2) Measurement of Average Particle Size (DA) Using Dynamic Light Scattering Method The particle size distribution of the binder composition obtained as described above was measured by using a particle size distribution analyzer ("FPAR-1000" manufactured by Otsuka Electronics Co., Ltd.) that utilizes a dynamic light scattering method as the measurement principle. The average particle size (D50) (DA) was determined from the particle size distribution, and found to be 500 nm.

The dynamic light scattering measurement conditions are listed below.
Dispersion medium: water
Measurement temperature: 25° C.
Dilution ratio: 0.1 wt %
Scattering angle: 160°
Light source laser wavelength: 632.8 nm (3) Measurement of Average Particle Size (DB) by TEM Observation One drop of a latex (0.1 wt %) obtained by diluting the binder composition obtained as described above was pipetted onto a collodion support membrane, and one drop of a 0.02 wt % osmium tetraoxide solution was pipetted onto the collodion support membrane. The collodion support membrane was air-dried for 12 hours to prepare a sample. The sample was observed using a transmission electron microscope (TEM) ("H-7650" manufactured by Hitachi High-Technologies Corporation) (magnification: 10K). An image analysis process was performed using a program "HITACH EMIP", and the average particle size (DB) of randomly selected fifty particles was calculated, and found to be 120 nm.

(4) Measurement of Electrolyte Solution Swelling Ratio 5 g (on a solid basis) of the binder composition obtained as described above was poured into a petri dish having a diameter of 8 cm, and dried at 40° C. for 1 day to obtain a dry film. The dry film was removed from the petri dish, and dried at 160° C. for 0.5 hours to obtain a test film. The test film was cut to have a size of 2×2 cm, and the initial mass (W0 (g)) was measured. The test film was then immersed in a standard electrolyte solution contained in a screw cap bottle at 70° C. for 24 hours. After removing the test film from the standard electrolyte solution, the electrolyte solution adhering to the surface of the test film was wiped off, and the post-immersion mass (W1 (g)) was measured. The electrolyte solution swelling ratio was calculated by the following expression (2) using the initial mass (W0 (g)) and the post-immersion mass (W1 (g)) measured as described above.

$$\text{Electrolyte solution swelling ratio (\%)} = (W1/W0) \times 100 \qquad (2)$$

(5) Measurement of pH

The pH of the binder composition obtained as described above was measured at 25° C. using a pH meter (manufactured by Horiba Ltd.), and found to be 4.4.

(6) Measurement of Viscosity

The viscosity of the binder composition obtained as described above was measured by using a Brookfield viscometer, and found to be 30 mPa·s (60 rpm, 25.0° C.).

(7) Measurement of Tg

The binder composition obtained as described above was subjected to measurement using a differential scanning calorimeter that conforms to JIS K 7121 ("DSC204 F1 Phoenix" manufactured by NETZSCH). It was found that the polymer (A) had one endothermic peak at 5° C.

5.1.2. Production and Evaluation of Electrical Storage Device Electrode Slurry (1) Synthesis of Silicon Material (Active Material)

A mixture including a pulverized silicon dioxide powder (average particle size: 10 micrometers) and a pulverized carbon powder (average particle size: 35 micrometers) was heated for 10 hours under a nitrogen stream (0.5 NL/min) in an electric furnace that was adjusted to 1,100 to 1,600° C. to obtain a silicon oxide powder (average particle size: 8 micrometers) represented by $SiO_x$ (x=0.5 to 1.1). 300 g of the silicon oxide powder was put in a batch-type heating furnace, and heated from room temperature (25° C.) to 1,100° C. at a heating rate of 300° C./h under a reduced pressure (absolute pressure) of 100 Pa (that was maintained using a vacuum pump). The silicon oxide powder was heated at 1,100° C. for 5 hours (graphite coating treatment) while maintaining the pressure inside the heating furnace at 2,000 Pa, and introducing methane gas at a flow rate of 0.5

NL/min. The silicon oxide powder subjected to the graphite coating treatment was cooled to room temperature at a cooling rate of 50° C./h to obtain about 330 g of a graphite-coated silicon oxide powder. The graphite-coated silicon oxide powder was a conductive powder (active material) in which the surface of silicon oxide was coated with graphite. The graphite-coated silicon oxide powder had an average particle size of 10 micrometers. The ratio of the graphite coating with respect to the entire graphite-coated silicon oxide (=100 mass %) was 2 mass %.

(2) Production of Electrical Storage Device Electrode Slurry

A twin-screw planetary mixer ("TK HIVIS MIX 2P-03" manufactured by PRIMIX Corporation) was charged with 1 part by mass (on a solid basis) of a thickener ("CMC2200" manufactured by Daicel Corporation) (added in the form of a 2 mass % aqueous solution), 94 parts by mass (on a solid basis) of artificial graphite (highly crystalline graphite) ("MAG" manufactured by Hitachi Chemical Co., Ltd.) (negative active material), 6 parts by mass (on a solid basis) of the graphite-coated silicon oxide powder obtained as described above, and 68 parts by mass of water. The mixture was stirred at 60 rpm for 1 hour. After the addition of the binder composition obtained as described above in such an amount that the ratio of the polymer (A) included in the binder composition was 2 parts by mass, the mixture was stirred for 1 hour to obtain a paste. After adjusting the solid content in the paste to 50 mass % by adding water, the mixture was stirred at 200 rpm for 2 minutes, at 1,800 rpm for 5 minutes, and at 1,800 rpm for 1.5 minutes under reduced pressure (about $2.5 \times 10^4$ Pa) using a stirrer/deaerator ("THINKY Mixer (Awatori Rentarou)" manufactured by THINKY Corporation) to prepare an electrical storage device electrode slurry (C/Si (5%)) in which the negative electrode active material included Si in a ratio of 5 mass %.

An electrical storage device electrode slurry (C) in which the negative electrode active material did not include Si, an electrical storage device electrode slurry (C/Si (10%)) in which the negative electrode active material included Si in a ratio of 10 mass %, and an electrical storage device electrode slurry (C/Si (20%)) in which the negative electrode active material included Si in a ratio of 20 mass %, were prepared in the same manner as the electrical storage device electrode slurry (C/Si (5%)), except that the amounts of artificial graphite and the graphite-coated silicon oxide powder were changed.

5.1.3. Production and Evaluation of Electrical Storage Device (1) Production of Electrical Storage Device Electrode (Negative Electrode)

The electrical storage device electrode slurry (C/Si (5%)) obtained as described above was uniformly applied to the surface of a collector formed of a copper foil (thickness: 20 micrometers) using a doctor blade method so that the thickness after drying was 80 micrometers. The applied electrical storage device electrode slurry was dried at 60° C. for 10 minutes, and then dried at 120° C. for 10 minutes. The resulting film was pressed using a roll press so that the resulting active material layer had the density listed in Table 1 to obtain an electrical storage device electrode (negative electrode).

An electrical storage device electrode (negative electrode) in which the active material layer included each active material was obtained in the same manner as described above, except that the electrical storage device electrode slurry (C) in which the negative electrode active material did not include Si, the electrical storage device electrode slurry (C/Si (10%)), or the electrical storage device electrode slurry (C/Si (20%)) was used as the electrical storage device electrode slurry.

(2) Production of Counter Electrode (Positive Electrode)

A twin-screw planetary mixer ("TK HIVIS MIX 2P-03" manufactured by PRIMIX Corporation) was charged with 4.0 parts by mass (on a solid basis) of an electrochemical device electrode binder ("KF Polymer #1120" manufactured by Kureha Corporation) (hereinafter referred to as "PVDF"), 3.0 parts by mass of a conductive aid ("DENKA BLACK" (50% pressed product) manufactured by Denka Co., Ltd.), 100 parts by mass (on a solid basis) of $LiCoO_2$ (manufactured by Hayashi Kasei Co., Ltd., average particle size: 5 micrometers) (positive electrode active material), and 36 parts by mass of N-methylpyrrolidone (NMP). The mixture was stirred at 60 rpm for 2 hours to prepare a paste. After the addition of NMP to the paste to adjust the solid content in the paste to 65 mass %, the mixture was stirred at 200 rpm for 2 minutes, stirred at 1,800 rpm for 5 minutes, and stirred at 1,800 rpm for 1.5 minutes under vacuum (about $2.5 \times 10^4$ Pa) using a stirrer/deaerator ("THINKY Mixer (Awatori Rentarou)" manufactured by THINKY Corporation) to prepare a positive electrode slurry. The positive electrode slurry was uniformly applied to the surface of an aluminum foil collector using a doctor blade method so that the thickness after removing the solvent was 80 micrometers. The applied positive electrode slurry was heated at 120° C. for 20 minutes to remove the solvent. The resulting film was pressed using a roll press so that the resulting active material layer had a density of 3.0 g/cm$^3$ to obtain a counter electrode (positive electrode).

(3) Assembly of Lithium-Ion Battery Cell

In a gloved box in which the internal atmosphere had been replaced by Ar so that the dew point was −80° C., a negative electrode (diameter: 15.95 mm) prepared by punching (cutting) the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching (cutting) a polypropylene porous membrane was placed on the negative electrode, and 500 microliters of an electrolyte solution was injected into the two-electrode coin cell while avoiding entrance of air. A positive electrode (diameter: 16.16 mm) prepared by punching (cutting) the positive electrode produced as described above was placed on the separator, and the outer casing of the two-electrode coin cell was air-tightly secured using a screw to assemble a lithium-ion battery cell (electrical storage device). Note that the electrolyte solution was prepared by dissolving $LiPF_6$ in an ethylene carbonate/ethylmethyl carbonate (mass ratio=1/1) mixture at a concentration of 1 mol/L.

(4) Evaluation of Charge-Discharge Cycle Characteristics

The electrical storage device produced as described above was charged in a thermostat bath (25° C.) at a constant current of 1.0 C until the voltage reached 4.2 V. The electrical storage device was continuously charged at a constant voltage of 4.2 V. The current was cut off (i.e., the electrical storage device was determined to be fully charged) when the current value reached 0.01 C. The electrical storage device was then discharged at a constant current of 1.0 C, and determined to be fully discharged (cut-off) when the voltage reached 3.0 V. The discharge capacity in the first cycle was calculated. The electrical storage device was repeatedly charged and discharged 100 times, and the discharge capacity in the hundredth cycle was calculated. The value obtained by dividing the discharge capacity in the hundredth cycle by the discharge capacity in the first cycle was taken as the 100-cycle discharge capacity retention ratio (%). When the 100-cycle discharge capacity retention ratio was 80% or more with respect to each active material, it was determined that deterioration in the electrode was suppressed during the charge-discharge cycle.

Note that "1 C" refers to a current value that requires 1 hour to fully discharge a cell having a given electrical capacitance. For example, "0.1 C" refers to a current value that requires 10 hours to fully discharge a cell, and "10 C" refers to a current value that requires 0.1 hours to fully discharge a cell.

5.2. Examples 2 to 17 and Comparative Examples 1 to 4

A binder composition including a polymer component in a ratio of 20% was obtained in the same manner as in Example 1 (see "5.1.1. Production and evaluation of binder composition"), except that the type and the amount of each monomer were changed as listed in Table 1 or 2.

An electrical storage device electrode slurry was prepared in the same manner as in Example 1, except that the resulting binder composition was used, and an electrical storage device electrode and an electrical storage device were produced and evaluated in the same manner as in Example 1.

5.3. Evaluation Results

The polymer composition, the properties, and the evaluation results used, measured, or obtained in Examples 1 to 17 and Comparative Examples 1 to 4 are listed in Tables 1 and 2.

TABLE 1

| | | | Example 1 | Example 2 | Example 3 | Example 4 | Example 5 | Example 6 |
|---|---|---|---|---|---|---|---|---|
| First-step polymerization | Repeating unit (A1) derived from unsaturated carboxylic acid | AA (parts by mass) | 3 | 4 | 3 | 3 | 2 | 4 |
| | | TA (parts by mass) | — | — | — | — | — | — |
| | | MAA (parts by mass) | 2 | 3 | 2 | 1 | 1 | 3 |
| | Repeating unit (A2) derived from conjugated diene compound | BD (parts by mass) | 32 | 35 | 32 | 28 | 20 | 35 |
| | Repeating unit (A3) derived from aromatic vinyl compound | ST (parts by mass) | 42 | 46 | 42 | 38 | 27 | 46 |
| | Repeating unit (A4) derived from (meth)acrylate compound | MMA (parts by mass) | — | — | — | — | — | — |
| | | HEMA (parts by mass) | — | — | — | — | — | — |
| | Repeating unit (A5) derived from alpha,beta-unsaturated nitrile compound | AN (parts by mass) | — | — | — | — | — | — |
| | Total in STEP 1 (parts by mass) | | 74 | 81 | 74 | 66 | 47 | 81 |
| Second-step polymerization | Repeating unit (A1) derived from unsaturated carboxylic acid | AA (parts by mass) | — | — | — | — | — | — |
| | | TA (parts by mass) | — | — | — | — | — | — |
| | | MAA (parts by mass) | 21 | 12 | 21 | 30 | 50 | 6 |
| | Repeating unit (A2) derived from conjugated diene compound | BD (parts by mass) | — | — | — | — | — | 3 |
| | Repeating unit (A3) derived from aromatic vinyl compound | ST (parts by mass) | — | — | — | — | — | 3 |
| | Repeating unit (A4) derived from (meth)acrylate compound | MMA (parts by mass) | — | — | — | — | — | — |
| | | HEMA (parts by mass) | — | — | — | — | — | — |
| | Repeating unit (A5) derived from alpha,beta-unsaturated nitrile compound | AN (parts by mass) | — | — | — | — | — | — |
| | Total in STEP 2 (parts by mass) | | 21 | 12 | 21 | 30 | 50 | 12 |
| Total | Repeating unit (A1) derived from unsaturated carboxylic acid | AA (parts by mass) | 3 | 4 | 3 | 3 | 2 | 4 |
| | | TA (parts by mass) | 0 | 0 | 0 | 0 | 0 | 0 |
| | | MAA (parts by mass) | 23 | 15 | 23 | 31 | 51 | 9 |
| | | Total (parts by mass) | 26 | 19 | 26 | 34 | 53 | 13 |
| | Repeating unit (A2) derived from conjugated diene compound | BD (parts by mass) | 32 | 35 | 32 | 28 | 20 | 38 |
| | Repeating unit (A3) derived from aromatic vinyl compound | ST (parts by mass) | 42 | 46 | 42 | 38 | 27 | 49 |
| | Repeating unit (A4) derived from (meth)acrylate compound | MMA (parts by mass) | 0 | 0 | 0 | 0 | 0 | 0 |
| | | HEMA (parts by mass) | 0 | 0 | 0 | 0 | 0 | 0 |
| | | Total (parts by mass) | 0 | 0 | 0 | 0 | 0 | 0 |
| | Repeating unit (A5) derived from alpha,beta-unsaturated nitrile compound | AN (parts by mass) | 0 | 0 | 0 | 0 | 0 | 0 |
| | Total | | 100 | 100 | 100 | 100 | 100 | 100 |
| WA1/WA2 | | | 0.81 | 0.54 | 0.81 | 1.21 | 2.65 | 0.34 |
| WA3/WA2 | | | 1.31 | 1.31 | 1.31 | 1.36 | 1.35 | 1.29 |
| Properties | Average particle size DA (nm) measured by using dynamic light scattering method | | 500 | 400 | 500 | 600 | 750 | 350 |
| | Average particle size DB (nm) measured by TEM observation | | 120 | 120 | 120 | 120 | 120 | 120 |
| | DA/DB | | 4.2 | 3.3 | 4.2 | 5.0 | 6.3 | 2.9 |
| | Electrolyte solution swelling ratio (%) | | 120 | 125 | 120 | 115 | 105 | 130 |
| | pH | | 4.4 | 4.7 | 4.4 | 4.1 | 3.8 | 5 |
| | Tg (° C.) | | 5 | 0 | 5 | 10 | 15 | 0 |
| Capacity retention ratio (after 100 cycles) | | C | 92 | 94 | 92 | 91 | 90 | 96 |
| | | C/Si(5%) | 90 | 90 | 90 | 90 | 89 | 90 |
| | | C/Si(10%) | 88 | 87 | 88 | 88 | 88 | 85 |
| | | C/Si(20%) | 85 | 84 | 85 | 87 | 88 | 80 |
| Positive electrode binder | | | PVDF | PVDF | PVDF | PVDF | PVDF | PVDF |

TABLE 1-continued

|  |  |  | Example 7 | Example 8 | Example 9 | Example 10 | Example 11 |
|---|---|---|---|---|---|---|---|
| First-step polymerization | Repeating unit (A1) derived from unsaturated carboxylic acid | AA (parts by mass) | 2 | 1 | 1 | 1 | 1 |
|  |  | TA (parts by mass) | — | 2 | 2 | 2 | 2 |
|  |  | MAA (parts by mass) | 1 | — | — | — | — |
|  | Repeating unit (A2) derived from conjugated diene compound | BD (parts by mass) | 20 | 39 | 39 | 39 | 39 |
|  | Repeating unit (A3) derived from aromatic vinyl compound | ST (parts by mass) | 27 | 28 | 28 | 28 | 28 |
|  | Repeating unit (A4) derived from (meth)acrylate compound | MMA (parts by mass) | — | 5 | 5 | 5 | 5 |
|  |  | HEMA (parts by mass) | — | — | — | — | — |
|  | Repeating unit (A5) derived from alpha,beta-unsaturated nitrile compound | AN (parts by mass) | — | 5 | 5 | 5 | 5 |
|  | Total in STEP 1 (parts by mass) |  | 47 | 77 | 77 | 77 | 77 |
| Second-step polymerization | Repeating unit (A1) derived from unsaturated carboxylic acid | AA (parts by mass) | — | — | 10 | — | — |
|  |  | TA (parts by mass) | — | — | — | 10 | — |
|  |  | MAA (parts by mass) | 25 | 20 | 10 | 10 | 15 |
|  | Repeating unit (A2) derived from conjugated diene compound | BD (parts by mass) | 10 | — | — | — | — |
|  | Repeating unit (A3) derived from aromatic vinyl compound | ST (parts by mass) | 15 | — | — | — | — |
|  | Repeating unit (A4) derived from (meth)acrylate compound | MMA (parts by mass) | — | — | — | — | 5 |
|  |  | HEMA (parts by mass) | — | — | — | — | — |
|  | Repeating unit (A5) derived from alpha,beta-unsaturated nitrile compound | AN (parts by mass) | — | — | — | — | — |
|  | Total in STEP 2 (parts by mass) |  | 50 | 20 | 20 | 20 | 20 |
| Total | Repeating unit (A1) derived from unsaturated carboxylic acid | AA (parts by mass) | 2 | 1 | 11 | 1 | 1 |
|  |  | TA (parts by mass) | 0 | 2 | 2 | 12 | 2 |
|  |  | MAA (parts by mass) | 26 | 20 | 10 | 10 | 15 |
|  |  | Total (parts by mass) | 28 | 23 | 23 | 23 | 18 |
|  | Repeating unit (A2) derived from conjugated diene compound | BD (parts by mass) | 30 | 39 | 39 | 39 | 39 |
|  | Repeating unit (A3) derived from aromatic vinyl compound | ST (parts by mass) | 42 | 28 | 28 | 28 | 28 |
|  | Repeating unit (A4) derived from (meth)acrylate compound | MMA (parts by mass) | 0 | 5 | 5 | 5 | 10 |
|  |  | HEMA (parts by mass) | 0 | 0 | 0 | 0 | 0 |
|  |  | Total (parts by mass) | 0 | 5 | 5 | 5 | 10 |
|  | Repeating unit (A5) derived from alpha,beta-unsaturated nitrile compound | AN (parts by mass) | 0 | 5 | 5 | 5 | 5 |
|  | Total |  | 100 | 100 | 100 | 100 | 100 |
| WA1/WA2 |  |  | 0.93 | 0.59 | 0.59 | 0.59 | 0.46 |
| WA3/WA2 |  |  | 1.40 | 0.72 | 0.72 | 0.72 | 0.72 |
| Properties | Average particle size DA (nm) measured using dynamic light scattering method |  | 450 | 500 | 500 | 500 | 500 |
|  | Average particle size DB (nm) measured by TEM observation |  | 80 | 180 | 180 | 180 | 180 |
|  | DA/DB |  | 5.6 | 2.8 | 2.8 | 2.8 | 2.8 |
|  | Electrolyte solution swelling ratio (%) |  | 120 | 115 | 115 | 115 | 125 |
|  | pH |  | 4.3 | 4.5 | 4.5 | 4.4 | 4.7 |
|  | Tg (° C.) |  | 10 | −5 | −5 | −5 | −5 |
| Capacity retention ratio (after 100 cycles) |  | C | 92 | 93 | 93 | 93 | 94 |
|  |  | C/Si(5%) | 90 | 90 | 90 | 90 | 90 |
|  |  | C/Si(10%) | 88 | 87 | 87 | 87 | 87 |
|  |  | C/Si(20%) | 85 | 85 | 85 | 85 | 84 |
| Positive electrode binder |  |  | PVDF | PVDF | PVDF | PVDF | PVDF |

TABLE 2

|  |  |  | Example 12 | Example 13 | Example 14 | Example 15 | Example 16 | Example 17 |
|---|---|---|---|---|---|---|---|---|
| First-step polymerization | Repeating unit (A1) derived from unsaturated carboxylic acid | AA (parts by mass) | 1 | 1 | 1 | 1 | 3 | 3 |
|  |  | TA (parts by mass) | 2 | 2 | 2 | 2 | — | — |
|  |  | MAA (parts by mass) | — | — | — | — | 2 | 2 |
|  | Repeating unit (A2) derived from conjugated diene compound | BD (parts by mass) | 39 | 39 | 39 | 39 | 32 | 32 |
|  | Repeating unit (A3) derived from aromatic vinyl compound | ST (parts by mass) | 28 | 28 | 28 | 28 | 42 | 42 |

TABLE 2-continued

|  |  |  | | | | | | |
|---|---|---|---|---|---|---|---|---|
| | Repeating unit (A4) derived from (meth)acrylate compound | MMA (parts by mass) | 5 | 5 | 5 | 5 | — | — |
| | | HEMA (parts by mass) | — | — | — | — | — | — |
| | Repeating unit (A5) derived from alpha,beta-unsaturated nitrile compound | AN (parts by mass) | 5 | 5 | 5 | 5 | — | — |
| | Total in STEP 1 (parts by mass) | | 77 | 77 | 77 | 77 | 74 | 74 |
| Second-step polymerization | Repeating unit (A1) derived from unsaturated carboxylic acid | AA (parts by mass) | — | — | — | — | — | — |
| | | TA (parts by mass) | — | — | — | — | — | — |
| | | MAA (parts by mass) | 15 | 15 | 10 | 15 | 21 | 21 |
| | Repeating unit (A2) derived from conjugated diene compound | BD (parts by mass) | 5 | — | 4 | — | — | — |
| | Repeating unit (A3) derived from aromatic vinyl compound | ST (parts by mass) | — | — | 5 | 5 | — | — |
| | | MMA (parts by mass) | — | — | — | — | — | — |
| | | HEMA (parts by mass) | — | — | 1 | — | — | — |
| | Repeating unit (A5) derived from alpha,beta-unsaturated nitrile compound | AN (parts by mass) | — | 5 | — | — | — | — |
| | Total in STEP 2 (parts by mass) | | 20 | 20 | 20 | 20 | 21 | 21 |
| Total | Repeating unit (A1) derived from unsaturated carboxylic acid | AA (parts by mass) | 1 | 1 | 1 | 1 | 3 | 3 |
| | | TA (parts by mass) | 2 | 2 | 2 | 2 | 0 | 0 |
| | | MAA (parts by mass) | 15 | 15 | 10 | 15 | 23 | 23 |
| | | Total (parts by mass) | 18 | 18 | 13 | 18 | 26 | 26 |
| | Repeating unit (A2) derived from conjugated diene compound | BD (parts by mass) | 44 | 39 | 43 | 39 | 32 | 32 |
| | Repeating unit (A3) derived from aromatic vinyl compound | ST (parts by mass) | 28 | 28 | 33 | 33 | 42 | 42 |
| | Repeating unit (A4) derived from (meth)acrylate compound | MMA (parts by mass) | 5 | 5 | 5 | 5 | 0 | 0 |
| | | HEMA (parts by mass) | 0 | 0 | 1 | 0 | 0 | 0 |
| | | Total (parts by mass) | 5 | 5 | 6 | 5 | 0 | 0 |
| | Repeating unit (A5) derived from alpha,beta-unsaturated nitrile compound | AN (parts by mass) | 5 | 10 | 5 | 5 | 0 | 0 |
| | Total | | 100 | 100 | 100 | 100 | 100 | 100 |
| WA1/WA2 | | | 0.41 | 0.46 | 0.30 | 0.46 | 0.81 | 0.81 |
| WA3/WA2 | | | 0.64 | 0.72 | 0.77 | 0.85 | 1.31 | 1.31 |
| Properties | Average particle size DA (nm) measured by using dynamic light scattering method | | 500 | 500 | 450 | 500 | 500 | 500 |
| | Average particle size DB (nm) measured by TEM observation | | 180 | 180 | 180 | 180 | 120 | 120 |
| | DA/DB | | 2.8 | 2.8 | 2.5 | 2.8 | 4.2 | 4.2 |
| | Electrolyte solution swelling ratio (%) | | 125 | 130 | 130 | 125 | 120 | 120 |
| | pH | | 4.6 | 4.6 | 5 | 4.6 | 4.4 | 4.4 |
| | Tg (° C.) | | −10 | −5 | −10 | −5 | 5 | 5 |
| Capacity retention ratio (after 100 cycles) | | C | 94 | 94 | 96 | 94 | 95 | 93 |
| | | C/Si(5%) | 90 | 90 | 90 | 90 | 93 | 91 |
| | | C/Si(10%) | 87 | 87 | 85 | 87 | 91 | 89 |
| | | C/Si(20%) | 84 | 84 | 80 | 84 | 88 | 86 |
| Positive electrode binder | | | PVDF | PVDF | PVDF | PVDF | Example 1 | Comparative Example 1 |

| | | | Comparative Example 1 | Comparative Example 2 | Comparative Example. 3 | Comparative Example 4 |
|---|---|---|---|---|---|---|
| First-step polymerization | Repeating unit (A1) derived from unsaturated carboxylic acid | AA (parts by mass) | 1 | 10 | 20 | 9 |
| | | TA (parts by mass) | 2 | 10 | 30 | 9 |
| | | MAA (parts by mass) | — | 12 | 30 | 11 |
| | Repeating unit (A2) derived from conjugated diene compound | BD (parts by mass) | 39 | 30 | 10 | 27 |
| | Repeating unit (A3) derived from aromatic vinyl compound | ST (parts by mass) | 28 | 26 | 10 | 23 |
| | Repeating unit (A4) derived from (meth)acrylate compound | MMA (parts by mass) | 5 | — | — | — |
| | | HEMA (parts by mass) | — | — | — | — |
| | Repeating unit (A5) derived from alpha,beta-unsaturated nitrile compound | AN (parts by mass) | 5 | 12 | — | 11 |
| | Total in STEP 1 (parts by mass) | | 77 | 68 | 20 | 61 |
| Second-step polymerization | Repeating unit (A1) derived from unsaturated carboxylic acid | AA (parts by mass) | — | — | — | — |
| | | TA (parts by mass) | — | — | — | 2 |
| | | MAA (parts by mass) | 2 | — | — | — |
| | Repeating unit (A2) derived from conjugated diene compound | BD (parts by mass) | 10 | — | — | 5 |
| | Repeating unit (A3) derived from aromatic vinyl compound | ST (parts by mass) | 8 | — | — | 3 |

| | | | | | | |
|---|---|---|---|---|---|---|
| | Repeating unit (A4) derived from (meth)acrylate compound | MMA (parts by mass) | — | — | — | — |
| | | HEMA (parts by mass) | — | — | — | — |
| | Repeating unit (A5) derived from alpha,beta-unsaturated nitrile compound | AN (parts by mass) | — | — | — | — |
| Total | Total in STEP 2 (parts by mass) | | 20 | 0 | 0 | 10 |
| | Repeating unit (A1) derived from unsaturated carboxylic acid | AA (parts by mass) | 1 | 10 | 20 | 9 |
| | | TA (parts by mass) | 2 | 10 | 30 | 11 |
| | | MAA (parts by mass) | 2 | 12 | 30 | 11 |
| | | Total (parts by mass) | 5 | 32 | 80 | 31 |
| | Repeating unit (A2) derived from conjugated diene compound | BD (parts by mass) | 49 | 30 | 10 | 32 |
| | Repeating unit (A3) derived from aromatic vinyl compound | ST (parts by mass) | 36 | 26 | 10 | 26 |
| | Repeating unit (A4) derived from (meth)acrylate compound | MMA (parts by mass) | 5 | 0 | 0 | 0 |
| | | HEMA (parts by mass) | 0 | 0 | 0 | 0 |
| | | Total (parts by mass) | 5 | 0 | 0 | 0 |
| | Repeating unit (A5) derived from alpha,beta-unsaturated nitrile compound | AN (parts by mass) | 5 | 12 | 0 | 11 |
| | Total | | 100 | 100 | 100 | 100 |
| WA1/WA2 | | | 0.10 | 1.07 | 8.00 | 0.97 |
| WA3/WA2 | | | 0.73 | 0.87 | 1.00 | 0.81 |
| Properties | Average particle size DA (nm) measured by using dynamic light scattering method | | 200 | 220 | Electrode could not be produced due to gelation | 250 |
| | Average particle size DB (nm) measured by TEM observation | | 180 | 180 | | 180 |
| | DA/DB | | 1.1 | 1.2 | | 1.4 |
| | Electrolyte solution swelling ratio (%) | | 200 | 150 | | 150 |
| | pH | | 7.6 | 6.6 | | 6.6 |
| | Tg (° C.) | | −15 | 5 | | 5 |
| Capacity retention ratio (after 100 cycles) | | C | 96 | 82 | | 80 |
| | | C/Si(5%) | 84 | 78 | | 77 |
| | | C/Si(10%) | 72 | 73 | | 74 |
| | | C/Si(20%) | 60 | 69 | | 70 |
| Positive electrode binder | | | PVDF | PVDF | — | PVDF |

5.4. Example 18

5.4.1. Production and Evaluation of Electrical Storage Device (1) Preparation of Positive Electrode Slurry and Production of Electrical Storage Device Positive Electrode A twin-screw planetary mixer ("TK HIVIS MIX 2P-03" manufactured by PRIMIX Corporation) was charged with 1 part by mass (on a solid basis) of a thickener ("CMC1120" manufactured by Daicel Corporation), 100 parts by mass of lithium iron phosphate (LiFePO$_4$) (manufactured by Hohsen Corp.), 5 parts by mass of acetylene black, and 68 parts by mass of water, and the mixture was stirred at 60 rpm for 1 hour. Note that lithium iron phosphate was pulverized using an agate mortar, and classified using a sieve so as to have an average particle size (D50) of 10 micrometers. Lithium iron phosphate was used as a positive electrode active material.

Next, the binder composition obtained in Example 1 and 5-chloro-2-methyl-isothiazolin-3-one (preservative) were added to the mixture. The binder composition obtained in Example 1 was added in such an amount that the ratio of the polymer (A) was 1 part by mass. The preservative was added in such an amount that the concentration of the preservative in the positive electrode slurry was 100 ppm.

The mixture was stirred for 1 hour to obtain a paste. After the addition of water to the paste to adjust the solid content to 50%, the mixture was stirred at 200 rpm for 2 minutes, stirred at 1800 rpm for 5 minutes, and stirred at 1800 rpm for 1.5 minutes under vacuum (about 5.0×10$^3$ Pa) using a stirrer/deaerator ("THINKY Mixer (Awatori Rentarou)" manufactured by THINKY Corporation) to prepare a positive electrode slurry. The positive electrode slurry was uniformly applied to the surface of an aluminum foil collector using a doctor blade method so that the thickness after removing the solvent was 80 micrometers. The applied positive electrode slurry was heated at 120° C. for 20 minutes to remove the solvent. The resulting film was pressed using a roll press so that the resulting active material layer had a density of 3.0 g/cm$^3$ to obtain a positive electrode.

(2) Production of Counter Electrode (Negative Electrode)

The negative electrode that was produced in Example 1 using the electrical storage device electrode slurry (C/Si (10%)) in which the negative electrode active material included Si in a ratio of 10 mass %, was used.

(3) Assembly of Lithium-Ion Battery Cell

An electrical storage device was produced in the same manner as in Example 1, except that the electrical storage device electrode produced as described above was used. The electrical storage device was evaluated in the same manner as in Example 1.

(4) Evaluation of Charge-Discharge Cycle Characteristics

The 100-cycle discharge capacity retention ratio (%) of the electrical storage device produced as described above was calculated in the same manner as in Example 1. The electrical storage device was repeatedly charged and discharged, and the 200-cycle discharge capacity retention ratio, the 300-cycle discharge capacity retention ratio, and the 500-cycle discharge capacity retention ratio were calculated. When the difference between the 100-cycle discharge capacity retention ratio and the 500-cycle discharge capacity retention ratio was 16% or less, it was determined that deterioration due to repeated charge and discharge was suppressed.

5.5. Examples 19 to 30 and Comparative Examples 5 to 7

An electrical storage device electrode slurry was prepared in the same manner as in Example 18, except that the binder composition listed in Table 3 was used, and an electrical storage device electrode and an electrical storage device were produced and evaluated in the same manner as in Example 18.

5.6. Evaluation Results

The polymer composition, the properties, and the evaluation results used, measured, or obtained in Examples 18 to 30 and Comparative Examples 5 to 7 are listed in Tables 3 and 4.

charge-discharge characteristics. The electrical storage device (lithium-ion secondary battery) including the resulting electrical storage device electrode exhibited excellent charge-discharge rate characteristics. Since the change in the thickness of the active material layer due to charge was reduced in Examples 1 to 17 as compared with Comparative Examples 1 to 4 (see Table 1), it is considered that the active material could be strongly held within the active material layer, and removal of the active material was suppressed.

As is clear from the results listed in Tables 3 and 4, the slurries of Example 18 to 30 prepared using the binder composition according to the invention could suppress dete-

TABLE 3

|  |  | Example 18 | Example 19 | Example 20 | Example 21 | Example 22 | Example 23 | Example 24 | Example 25 |
|---|---|---|---|---|---|---|---|---|---|
| Binder composition used for positive electrode |  | PVDF | Example 1 | Example 2 | Example 4 | Example 5 | Example 6 | Example 7 | Example 8 |
| Binder composition used for negative electrode |  | Example 1 | Example 1 | Example 1 | Example 1 | Example 1 | Example 1 | Example 1 | Example 1 |
| Capacity retention ratio (C/Si = 90/10) | 100 cycles | 88 | 91 | 90 | 91 | 91 | 91 | 88 | 90 |
|  | 200 cycles | 83 | 88 | 87 | 88 | 88 | 88 | 85 | 87 |
|  | 300 cycles | 79 | 86 | 75 | 86 | 86 | 86 | 83 | 85 |
|  | 500 cycles | 76 | 85 | 84 | 85 | 85 | 85 | 82 | 83 |
| Difference between 500-cycle capacity retention ratio and 100-cycle capacity retention ratio |  | 12 | 6 | 6 | 6 | 6 | 6 | 6 | 7 |

TABLE 4

|  |  | Example 26 | Example 27 | Example 28 | Example 29 | Example 30 | Comparative Example 5 | Comparative Example 6 | Comparative Example 7 |
|---|---|---|---|---|---|---|---|---|---|
| Binder composition used for positive electrode |  | Example 9 | Example 10 | Example 11 | Example 12 | Example 13 | Comparative Example 1 | Comparative Example 2 | Comparative Example 1 |
| Binder composition used for negative electrode |  | Example 1 | Example 1 | Example 1 | Comparative Example 1 | Comparative Example 2 | Comparative Example 1 | Comparative Example 2 | PVDF |
| Capacity retention ratio (C/Si = 90/10) | 100 cycles | 90 | 90 | 90 | 75 | 76 | 73 | 74 | 63 |
|  | 200 cycles | 87 | 87 | 87 | 68 | 69 | 65 | 66 | 53 |
|  | 300 cycles | 85 | 85 | 85 | 63 | 64 | 58 | 60 | 45 |
|  | 500 cycles | 83 | 83 | 83 | 59 | 60 | 54 | 55 | 39 |
| Difference between 500-cycle capacity retention ratio and 100-cycle capacity retention ratio |  | 7 | 7 | 7 | 16 | 16 | 19 | 19 | 24 |

The meaning of the abbreviation with respect to each monomer listed in Tables 1 to 4 is as follow.

BD: 1,3-butadiene
ST: styrene
MMA: methyl methacrylate
HEMA: 2-hydroxyethyl methacrylate
AA: acrylic acid
MAA: methacrylic acid
TA: itaconic acid
AN: acrylonitrile
PVDF: electrochemical device electrode binder ("KF Polymer #1120" manufactured by Kureha Corporation)

As is clear from the results listed in Tables 1 and 2, the slurries of Example 1 to 17 prepared using the binder composition according to the invention could advantageously bind the active material that changes in volume to a large extent due to charge and discharge, and advantageously maintain the adhesion between the active material layer and the collector, as compared with Comparative Examples 1 to 4. It was thus possible to obtain an electrical storage device electrode in which removal (separation) of the active material was reduced even when the active material repeatedly changed in volume due to repeated charge and discharge, and which could maintain excellent rioration in discharge capacity retention ratio due to repeated charge and discharge, and maintain excellent charge-discharge characteristics, as compared with Comparative Examples 5 to 7. It is considered that breakage of the aggregation state of the active material could be suppressed, and the conductive network within the active material layer could be maintained.

It was also found that excellent charge-discharge characteristics are effectively maintained when the binder composition according to the invention is used to produce the negative electrode as compared with the case where the binder composition according to the invention is used to produce the positive electrode. There was a tendency that a better capacity retention ratio was obtained when the binder composition including the SBR copolymer was used to produce the positive electrode as compared with the case where PVDF was used. It is considered that this is because the binding capability is improved when the SBR copolymer is used to produce the positive electrode as compared the case where PVDF is used to produce the positive electrode. There was a tendency that the binding capability and the capacity retention ratio were further improved when the SBR copolymer in which a repeating unit derived from an unsaturated carboxylic acid was present on the surface of the particles, was used.

The invention is not limited to the embodiments described above. Various modifications and variations may be made of the embodiments described above. For example, the invention includes various other configurations substantially the same as the configurations described above in connection with the embodiments (e.g., a configuration having the same function, method, and results, or a configuration having the same objective and results). The invention also includes a configuration in which an unsubstantial element described above in connection with the embodiments is replaced with another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

The invention claimed is:

1. An electrical storage device electrode binder composition, comprising:
    a polymer (A) and a liquid medium (B),
    wherein the polymer (A) comprises a repeating unit (A1) derived from an unsaturated carboxylic acid in an amount of 10 to 70 parts by mass, provided that a total amount of repeating units included in the polymer (A) is 100 parts by mass,
    the polymer (A) is polymer particles, and
    a ratio (DA/DB) of an average particle size (DA) of the polymer particles measured by using a dynamic light scattering method to an average particle size (DB) of the polymer particles measured by TEM observation is from 2 to 10.

2. The electrical storage device electrode binder composition according to claim 1, wherein the average particle size (DA) of the polymer particles measured by using the dynamic light scattering method is 250 to 1,000 nm.

3. The electrical storage device electrode binder composition according to claim 1, wherein the polymer (A) has an electrolyte solution swelling ratio of 130% or less.

4. The electrical storage device electrode binder composition according to claim 1, wherein the composition has a pH of 3 to 6.

5. An electrical storage device electrode slurry, comprising the electrical storage device electrode binder composition according to claim 1, and an active material.

6. The electrical storage device electrode slurry according to claim 5, wherein the active material comprises a silicon material.

7. An electrical storage device electrode, comprising:
    a collector; and
    an active material layer provided on a surface of the collector, the active material being a dried product of the electrical storage device electrode slurry according to claim 5.

8. The electrical storage device electrode according to claim 7, wherein the active material layer comprises silicon in an amount of 2 to 30 parts by mass based on 100 parts by mass of the active material layer.

9. The electrical storage device electrode slurry according to claim 5, wherein the active material comprises a lithium-containing phosphoric acid compound having an olivine structure.

10. An electrical storage device electrode, comprising:
    a collector; and
    an active material layer provided on a surface of the collector, the active material layer being a dried product of the electrical storage device electrode slurry according to claim 9.

11. An electrical storage device, comprising the electrical storage device electrode according to claim 7.

12. An electrical storage device, comprising the electrical storage device electrode according to claim 10.

13. The electrical storage device electrode binder composition according to claim 1, wherein the ratio (DA/DB) is from 2.5 to 6.5.

14. The electrical storage device electrode binder composition according to claim 1, wherein the average particle size (DA) of the polymer particles measured by using the dynamic light scattering method is 300 to 800 nm.

15. The electrical storage device electrode binder composition according to claim 1, wherein the polymer (A) further comprises a repeating unit (A2) derived from a conjugated diene compound, a repeating unit (A3) derived from an aromatic vinyl compound, a repeating unit (A4) derived from an unsaturated carboxylic acid ester, and a repeating unit (A5) derived from an alpha, beta-unsaturated nitrile compound.

* * * * *